United States Patent
Chang et al.

(10) Patent No.: US 10,281,635 B2
(45) Date of Patent: May 7, 2019

(54) LIGHT GUIDE PLATE, BACKLIGHT MODULE AND DISPLAY DEVICE

(71) Applicants: Radiant Opto-Electronics (Suzhou) Co.,Ltd., Jiangsu (CN); Radiant Opto-Electronics Corporation, Kaohsiung (TW)

(72) Inventors: Chia-Yin Chang, Kaohsiung (TW); Chin-Ting Weng, Kaohsiung (TW)

(73) Assignees: Radiant Opto-Electronics (Suzhou) Co.,Ltd., Jiangsu (CN); Radiant Opto-Electronics Corporation, Kaohsiung (TW)

( * ) Notice: Subject to any disclaimer, the term of this patent is extended or adjusted under 35 U.S.C. 154(b) by 110 days.

(21) Appl. No.: 15/378,070

(22) Filed: Dec. 14, 2016

(65) Prior Publication Data

US 2017/0123130 A1    May 4, 2017

Related U.S. Application Data

(63) Continuation-in-part of application No. 14/918,591, filed on Oct. 21, 2015, now Pat. No. 9,557,469, which
(Continued)

(30) Foreign Application Priority Data

| Mar. 16, 2012 | (TW) | ............................... 101109144 A |
| Jun. 27, 2012 | (TW) | ............................... 101212386 A |
| Sep. 6, 2016 | (WO) | ................ PCT/CN2016/098190 |

(51) Int. Cl.
*G02B 6/00*     (2006.01)
*F21V 8/00*     (2006.01)

(52) U.S. Cl.
CPC .......... *G02B 6/002* (2013.01); *G02B 6/0031* (2013.01); *G02B 6/0068* (2013.01);
(Continued)

(58) Field of Classification Search
CPC .... G02B 6/002; G02B 6/0023; G02B 6/0028; G02B 6/0031; G02B 6/0035;
(Continued)

(56) References Cited

U.S. PATENT DOCUMENTS

| 7,898,613 B2 * | 3/2011 | Jung .................... G02B 6/0036 349/64 |
| 2010/0182542 A1 * | 7/2010 | Nakamoto ........... G02B 6/0016 349/65 |

(Continued)

FOREIGN PATENT DOCUMENTS

| CN | 1849481 A | 10/2006 |
| CN | 201269932 Y | 7/2009 |

(Continued)

*Primary Examiner* — Y M. Lee
(74) *Attorney, Agent, or Firm* — CKC & Partners Co., LLC

(57) ABSTRACT

A light guide plate and a backlight module are described. The light guide plate includes a main body and a plurality of stripe microstructures. The main body includes a light incidence surface, a light-emitting surface and a light reflective surface. The light-emitting surface is opposite to the light reflective surface, and the light incidence surface is connected between the light-emitting surface and the light reflective surface. The light-emitting surface includes a microstructure region adjacent to the light incidence surface. The stripe microstructures are arranged in the microstructure region, and parallel to a normal line of the light incidence surface.

18 Claims, 33 Drawing Sheets

Related U.S. Application Data is a continuation-in-part of application No. 13/751,166, filed on Jan. 28, 2013, now Pat. No. 9,223,079.

(52) U.S. Cl.
CPC ............ *G02B 6/0088* (2013.01); *G02B 6/004* (2013.01); *G02B 6/0036* (2013.01); *G02B 6/0043* (2013.01); *G02B 6/0055* (2013.01)

(58) Field of Classification Search
CPC .. G02B 6/0036; G02B 6/0043; G02B 6/0045; G02B 6/005; G02B 6/0068; G02B 6/0073; G02B 6/0088; G02B 6/004; G02B 6/0011
See application file for complete search history.

(56) References Cited

U.S. PATENT DOCUMENTS

| | | | |
|---|---|---|---|
| 2011/0103091 A1 | 5/2011 | Kunimochi et al. | |
| 2011/0122651 A1* | 5/2011 | Komano | G02B 6/002 |
| | | | 362/618 |
| 2011/0286237 A1* | 11/2011 | Tanoue | G02B 6/0016 |
| | | | 362/606 |
| 2013/0301298 A1* | 11/2013 | Liu | G02B 6/0091 |
| | | | 362/613 |
| 2014/0036541 A1 | 2/2014 | Takada et al. | |
| 2014/0132887 A1 | 5/2014 | Kurata | |

FOREIGN PATENT DOCUMENTS

| | | |
|---|---|---|
| CN | 101630037 A | 1/2010 |
| CN | 101755167 A | 6/2010 |
| CN | 101846267 A | 9/2010 |
| CN | 102047030 A | 5/2011 |
| CN | 102128388 A | 7/2011 |
| CN | 102913855 A | 2/2013 |
| CN | 202719395 U | 2/2013 |
| CN | 103913795 A | 7/2014 |
| TW | M416108 U | 11/2011 |
| TW | 201346394 A | 11/2013 |

* cited by examiner

LIGHT GUIDE PLATE, BACKLIGHT MODULE AND DISPLAY DEVICE

RELATED APPLICATIONS

This application claims priority to International Application No. PCT/CN2016/098190 filed on Sep. 6, 2016 and is a continuation-in-part application of U.S. application Ser. No. 14/918,591, filed on Oct. 21, 2015, which is a continuation-in-part application of U.S. application Ser. No. 13/751, 166, filed on Jan. 28, 2013, now U.S. Pat. No. 9,223,079, which claims priority to Taiwan Application Serial Number 101109144, filed Mar. 16, 2012 and Taiwan Application Serial Number 101212386, filed Jun. 27, 2012.

The entire disclosures of all the above applications are hereby incorporated by reference herein.

FIELD OF THE INVENTION

The present invention relates to a light guide element and applications thereof, and more particularly to a light guide plate, a backlight module and a display device.

BACKGROUND OF THE INVENTION

As the rapid development of point light sources, such as light-emitting diodes (LEDs), a light source type of backlight modules is gradually changed from a linear light source type to a point light source type, for example from conventional linear cold-cathode fluorescent lamps (CCFLs) to point light-emitting diodes. Refer to FIG. 1 and FIG. 2. FIG. 1 and FIG. 2 respectively illustrate a top view of an arrangement of a light guide plate and light-emitting diodes and a side view of a conventional backlight module. A backlight module 100 mainly includes a light guide plate 102, a plurality of light-emitting diodes 108 and a cover 112.

In the backlight module 100, the light-emitting diodes 108 are disposed near a light incidence surface 106 of the light guide plate and emit light 110 toward the light incidence surface 106 of the light guide plate 102. The cover 112 covers the light-emitting diodes 108 and a portion of a light-emitting surface 104 on a light incidence side of the light guide plate 102, i.e. covers a non-visible region 118 of the light-emitting surface 104. Light 110 emitted by the light-emitting diodes 108 enters the light guide plate 102 through the light incidence surface 106, and is emitted out of the light guide plate 102 through the light-emitting surface 104 of the light guide plate 102 after being guided by the light guide plate 102.

Refer to FIG. 3. FIG. 3 illustrates a side view of another conventional backlight module. A structure of a backlight module 100a is substantially the same as that of the aforementioned backlight module 100, and a difference between the two structures is that a light guide plate 102a of the backlight module 100a includes a tapered portion 120 and a flat plate portion 122. A thickness of the tapered portion 120 is gradually lessened from the light incidence surface 106 toward the flat plate portion 122. In the backlight module 100a, expect for a top edge of the light incidence surface 106, distances between the light-emitting surface 104a of the light guide plate 102a and the cover 112 increase.

However, as shown in FIG. 2 and FIG. 3, if a covering range of the cover 112 is too short, an appearance light leakage phenomenon is very easy to form in the non-visible region 118 on the light incidence side of the backlight module 100 or 100a. In addition, the light-emitting diodes 108 are highly directional, so that an uneven brightness condition due to the light leakage in the non-visible region 118 of the backlight module 100 or 100a is very serious. Accordingly, eyes 114 of a user see that the backlight module 100 or 100a has poor appearance brightness uniformity and hot spots 116 usually formed on its light incidence side, such as shown in FIG. 4. Therefore, appearance brightness distribution of the conventional backlight modules 100 and 100a is uneven to seriously affect vision effects of the backlight modules 100 and 100a.

SUMMARY OF THE INVENTION

Therefore, one aspect of the present invention is to provide a light guide plate and a backlight module, in which a microstructure region of a light-emitting surface of the light guide plate near a light incidence surface is set with a plurality of stripe microstructures, which are parallel to a normal line of the light incidence surface. The stripe microstructures can scatter incident light of a non-visible region, so that leakage light on the non-visible region can be effectively blurred to greatly improve an uneven brightness phenomenon in the non-visible region.

Another aspect of the present invention is to provide a light guide plate and a backlight module, in which many dot microstructures are distributed in a microstructure region of the light guide plate near a light incidence surface and lengthwise crossing a light-emitting surface. The dot microstructures can blur light reflected back to a light-emitting surface of the light guide plate, so that a spray phenomenon caused by point light sources with high directionality can be greatly improved.

Still another aspect of the present invention is to provide a backlight module, which has emitted light of highly uniform.

According to the aforementioned aspects, the present invention provides a light guide plate. The light guide plate includes a main body and a plurality of stripe microstructures. The main body includes a light incidence surface, a light-emitting surface and a light reflective surface. The light-emitting surface is opposite to the light reflective surface, and the light incidence surface is connected between the light-emitting surface and the light reflective surface. The light-emitting surface includes a microstructure region adjacent to the light incidence surface. The stripe microstructures are arranged in the microstructure region, and parallel to a normal line of the light incidence surface.

According to a preferred embodiment of the present invention, the stripe microstructures are a plurality of V-cut structures and/or a plurality of R-cut structures.

According to another preferred embodiment of the present invention, a central angle of each R-cut structure ranges from 60 degrees to 120 degrees.

According to still another preferred embodiment of the present invention, a flare angle of each V-cut structure ranges from 60 degrees to 120 degrees.

According to yet another preferred embodiment of the present invention, the stripe microstructures are closely adjacent to each other.

According to further another preferred embodiment of the present invention, a range of the microstructure region on the light-emitting surface is within 20 mm extending from the light incidence surface along the normal line of the light incidence surface.

According to still yet another preferred embodiment of the present invention, the main body is a flat plate with a uniform thickness.

According to still further another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along the normal line of the light incidence surface, and a thickness of the flat plate portion is equal to the thickness of the second end.

According to yet further another preferred embodiment of the present invention, the stripe microstructures are disposed on the tapered portion and/or the flat plate portion.

According to yet further another preferred embodiment of the present invention, the light guide plate further includes a plurality of microstructures disposed on the light reflective surface.

According to the aforementioned aspects, the present invention further provides a backlight module. The backlight module includes a light guide plate and a plurality of light sources. The light guide plate includes a main body and a plurality of stripe microstructures. The main body includes a light incidence surface, a light-emitting surface and a light reflective surface. The light-emitting surface is opposite to the light reflective surface, and the light incidence surface is connected between the light-emitting surface and the light reflective surface. The light-emitting surface includes a microstructure region adjacent to the light incidence surface. The stripe microstructures are arranged in the microstructure region, and parallel to a normal line of the light incidence surface. The light sources are adjacent to the light incidence surface.

According to a preferred embodiment of the present invention, the stripe microstructures are a plurality of V-cut structures and/or a plurality of R-cut structures.

According to another preferred embodiment of the present invention, a central angle of each R-cut structure ranges from 60 degrees to 120 degrees.

According to still another preferred embodiment of the present invention, a flare angle of each V-cut structure ranges from 60 degrees to 120 degrees.

According to yet another preferred embodiment of the present invention, the stripe microstructures are closely adjacent to each other.

According to further another preferred embodiment of the present invention, a range of the microstructure region on the light-emitting surface is within 20 mm extending from the light incidence surface along the normal line of the light incidence surface.

According to still yet another preferred embodiment of the present invention, the main body is a flat plate with a uniform thickness.

According to still further another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along the normal line of the light incidence surface, and a thickness of the flat plate portion is equal to the thickness of the second end.

According to yet further another preferred embodiment of the present invention, the stripe microstructures are disposed on the tapered portion and/or the flat plate portion.

According to yet further another preferred embodiment of the present invention, the light guide plate further includes a plurality of microstructures disposed on the light reflective surface.

According to yet further another preferred embodiment of the present invention, the light sources are a plurality of light-emitting diodes.

According to the aforementioned aspects, the present invention further provides a light guide plate. The light guide plate includes a main body and a plurality of dot microstructures. The main body includes a light incidence surface, a light-emitting surface, a light reflective surface, a first side surface and a second side surface opposite to the first side surface. The light-emitting surface is opposite to the light reflective surface. The first side surface, the light incidence surface and the second side surface all are connected between the light-emitting surface and the light reflective surface. The light incidence surface is located between the first side surface and the second side surface. The light-emitting surface includes a microstructure region extending from the first side surface to the second side surface and separated from the light incidence surface by a distance. The dot microstructures are distributed in the whole microstructure region.

According to a preferred embodiment of the present invention, the main body is a flat plate with a uniform thickness.

According to another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along the normal line of the light incidence surface, and a thickness of the flat plate portion is equal to the thickness of the second end.

According to still another preferred embodiment of the present invention, the microstructure region is located on the flat plate portion.

According to yet another preferred embodiment of the present invention, a direction of the microstructure region extending from the first side surface to the second side surface is perpendicular to a normal line of the light incidence surface.

According to further another preferred embodiment of the present invention, the distance is greater than 0, and equal to or smaller than 20 mm.

According to the aforementioned aspects, the present invention further provides a backlight module. The backlight module includes a light guide plate, a plurality of light sources and a cover. The light guide plate includes a main body and a plurality of dot microstructures. The main body includes a light incidence surface, a light-emitting surface, a light reflective surface, a first side surface and a second side surface opposite to the first side surface. The light-emitting surface is opposite to the light reflective surface. The first side surface, the light incidence surface and the second side surface all are connected between the light-emitting surface and the light reflective surface. The light incidence surface is located between the first side surface and the second side surface. The light-emitting surface includes a microstructure region extending from the first side surface to the second side surface and separated from the light incidence surface by a distance. The dot microstructures are distributed in the whole microstructure region. The light sources are adjacent to the light incidence surface. The cover is disposed over the light sources, the light incidence surface and a portion of the light-emitting surface near the light incidence surface to reflect light emitted by the light sources to the light-emitting surface.

According to a preferred embodiment of the present invention, the main body is a flat plate with a uniform thickness.

According to another preferred embodiment of the present invention, the main body includes a tapered portion and a flat plate portion. The tapered portion has a first end and a second end opposite to each other, in which a thickness of the first end is larger than a thickness of the second end. The flat plate portion extends from the second end along a normal line of the light incidence surface, in which a thickness of the flat plate portion is equal to the thickness of the second end.

According to still another preferred embodiment of the present invention, the microstructure region is located on the flat plate portion.

According to yet another preferred embodiment of the present invention, a direction of the microstructure region extending from the first side surface to the second side surface is perpendicular to a normal line of the light incidence surface.

According to further another preferred embodiment of the present invention, the distance is greater than 0, and equal to or smaller than 20 mm.

According to still yet another preferred embodiment of the present invention, the light sources are a plurality of light-emitting diodes.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

Figure 5:
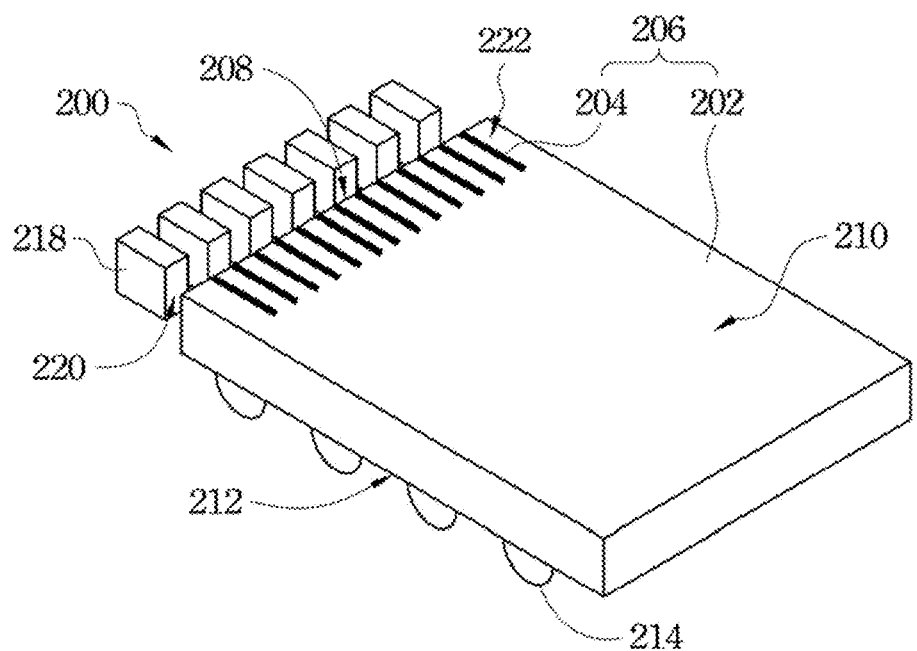
FIG. 5 illustrates a perspective view of a backlight module in accordance with an embodiment of the present invention.

Refer to FIG. 5. FIG. 5 illustrates a perspective view of a backlight module in accordance with an embodiment of the present invention. In the present embodiment, a backlight module 200 mainly includes a light guide plate 206 and a plurality of light sources 218. The light guide plate 206 includes a main body 202 and a plurality of stripe microstructures 204. In one exemplary example, the main body 202 may be a flat plate with a uniform thickness. The main body 202 may include a light incidence surface 208, a light-emitting surface 210 and a light reflective surface 212. In the main body 202, the light-emitting surface 210 and the light reflective surface 212 are on two opposite sides of the main body 202, and the light incidence surface 208 is connected between the light-emitting surface 210 and the light reflective surface 212. The light incidence surface 208 of the main body 202 may be a mirror surface or a surface having microstructures. In addition, the light-emitting surface 210 of the main body 202 may include a microstructure region 222 adjacent to the light incidence surface 208.

In the light guide plate 206, the stripe microstructures 204 are disposed in the microstructure region 222 of the light-emitting surface 210 of the main body 202. In one exemplary example, as shown in FIG. 5, the stripe microstructures 204 are arranged in the entire microstructure region 222 of the light-emitting surface 210. In one example, the stripe microstructures 204 are closely adjacent to each other. However, in another exemplary example, the stripe microstructures 204 arranged in the entire microstructure region 222 are not distributed in the entire microstructure region 222. An extending direction of each stripe microstructure 204 in the microstructure region 222 is parallel to a normal line of the light incidence surface 208. In one exemplary example, a range of the microstructure region 222 of the light-emitting surface 210 is within 20 mm extending from one end of the light-emitting surface, which is connected with the light incidence surface 208, along the normal line of the light incidence surface 208.

In some exemplary examples, the stripe microstructures 204 may be, for example, a plurality of V-cut structures and/or a plurality of R-cut structures. Central angles of the R-cut structures may range from 60 degrees to 120 degrees, for example. In addition, flare angles of the V-cut structures may range from 60 degrees to 120 degrees, for example. In one preferred example, the central angles of the R-cut structures or the flare angles of the V-cut structures are 100 degrees.

Refer to FIG. 5 again. The light sources 218 are disposed at a side of the light incidence surface 208, and adjacent to the light incidence surface 208. Light-emitting surfaces 220 of the light sources 218 are preferably opposite to the light incidence surface 208 of the light guide plate 206, so that the light sources 218 can emit light toward the light incidence surface 208. In one exemplary example, the light sources 218 may be point light sources, such as light-emitting diodes. The emitting light of the point light sources, such as the light-emitting diodes, is highly directional and narrow, and by arranging the stripe microstructures 204 within the microstructure region 222 of the light-emitting surface 210, the light emitted from the microstructure region 222 of the light-emitting surface 210 of the main body 202 can be scattered. Therefore, the leakage light on the light incidence side of the light guide plate 206 is uniformed to further uniform brightness of a light-emitting surface of the backlight module 200.

In some exemplary examples, the light guide plate 206 may further selectively include a plurality of microstructures 214 according to optical performance required by the backlight module 200. As shown in FIG. 5, the microstructures 214 may be arranged on the light reflective surface 212 of the main body 202 of the light guide plate 206. The microstructures 214 may be stripe structures, such as V-cut structures and R-cut structures, or may be taper structures or taper indentations.

Figure 6A:
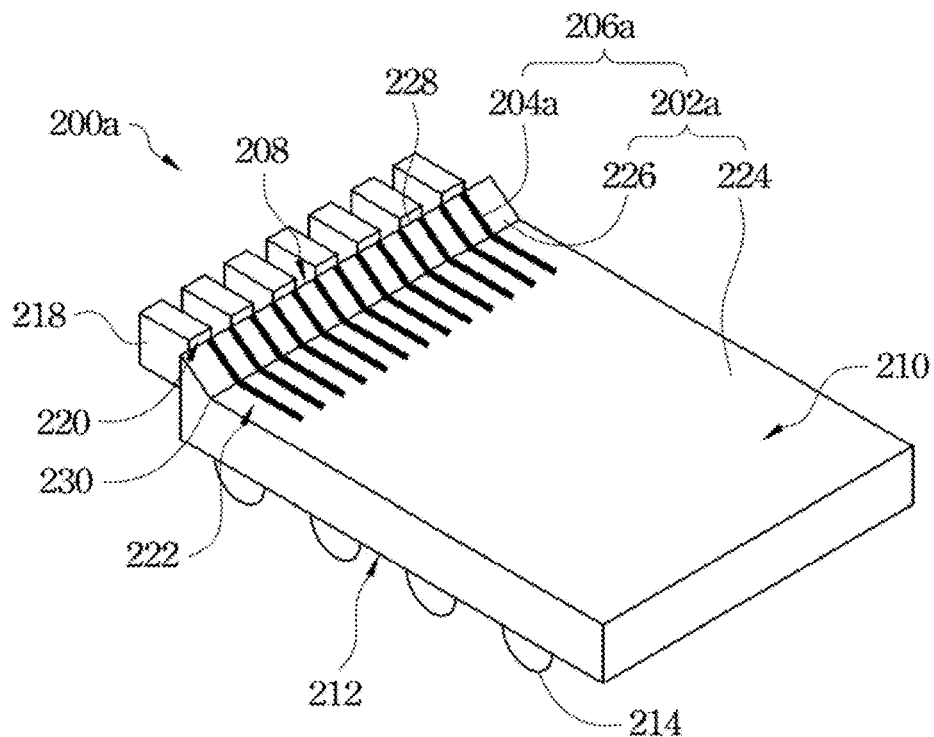
FIG. 6A illustrates a perspective view of a backlight module in accordance with another embodiment of the present invention.

The main body of the light guide plate of the present invention may not be a flat plate with a uniform thickness. Refer to FIG. 6A. FIG. 6A illustrates a perspective view of a backlight module in accordance with another embodiment of the present invention. A structure of a backlight module 200a of the present embodiment is substantially the same as that of the backlight module 200 of the aforementioned embodiment, and a difference between the two structures is that a main body 202a of a light guide plate 206a of the backlight module 200a is not a flat plate with a uniform thickness.

In the backlight module 200a, the light guide plate 206a includes a tapered portion 226 and a flat plate portion 224. The tapered portion 226 has a first end 228 and a second end 230 opposite to each other. The thickness of the tapered portion 226 is gradually decreased from the first end 228 to the second end 230, i.e. the first end 228 of the tapered portion 226 is thicker than the second end 230. In addition, the flat plate portion 224 extends from the second end 230 of the tapered portion 226 along the normal line of the light incidence surface 208. A thickness of the flat plate portion 224 is the same as that of the second end 230 of the tapered portion 226. In the present embodiment, the microstructure region 222 extends on the tapered portion 226 and a portion of the flat plate portion 224, and the stripe microstructures 204a are disposed in the microstructure region 222 on the tapered portion 226 and the flat plate portion 224.

Figure 6B:
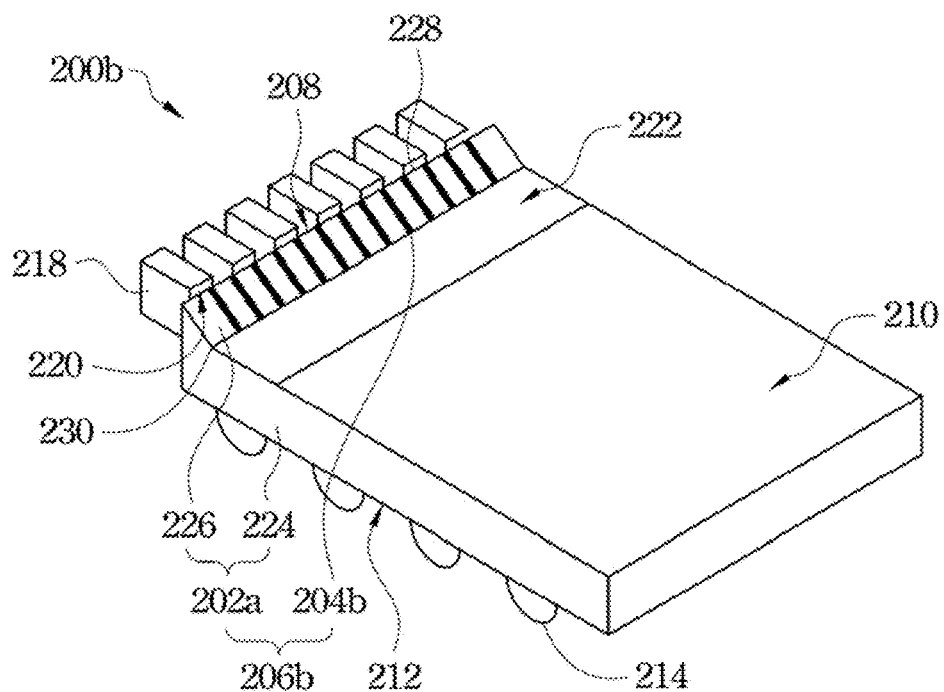
FIG. 6B illustrates a perspective view of a backlight module in accordance with still another embodiment of the present invention.
Figure 6C:
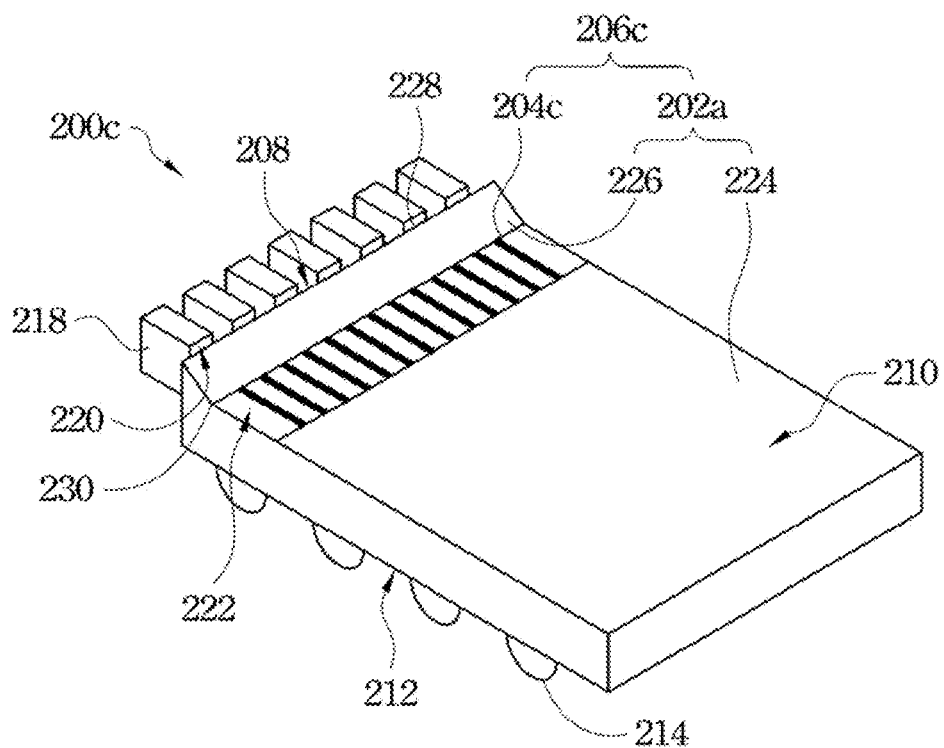
FIG. 6C illustrates a perspective view of a backlight module in accordance with yet another embodiment of the present invention.

The stripe microstructures of the present invention may not be distributed in the entire microstructure region. Refer to FIG. 6B and FIG. 6C. FIG. 6B and FIG. 6C respectively illustrate perspective views of backlight modules in accordance with another two embodiments of the present invention. Structures of backlight modules 200b and 200c are substantially the same as that of the backlight module 200a of the aforementioned embodiment, and differences among the structures of the backlight module 200a, 200b and 200c are that: stripe microstructures 204b of a light guide plate 206b of the backlight module 200b and the stripe microstructures 204c of a light guide plate 206c of the backlight module 200c are arranged in a portion of microstructure regions 222 respectively.

As shown in FIG. 6B, in the backlight module 200b, the stripe microstructures 204b of the light guide plate 206b only extend in the microstructure region 222 on the tapered portion 226 of the main body 202a. On the other hand, as shown in FIG. 6C, in the backlight module 200c, the stripe microstructures 204c of the light guide plate 206c only extend in the microstructure region 222 on the flat plate portion 224 of the main body 202a.

In the present invention, the microstructure region of the light-emitting surface of the main body of the light guide plate may be divided into several regions, and the regions may be set with stripe microstructures with different structure shapes, such as R-cut structures and V-cut structures. Or, the regions of the microstructure region may be set with stripe microstructures with a same structure shape but different central angles or flare angles. Certainly, the microstructure region of the light-emitting surface of the main body of the light guide plate may be set with stripe microstructures with a same structure shape and a same central angle or a same flare angle.

Figure 3:
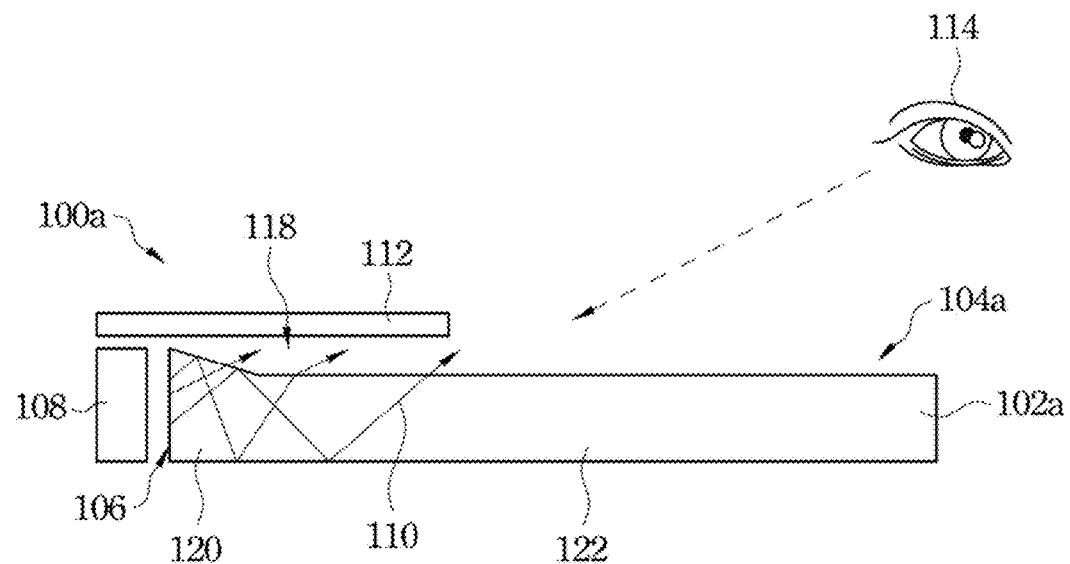
FIG. 3 illustrates a side view of another conventional backlight module.
Figure 4:
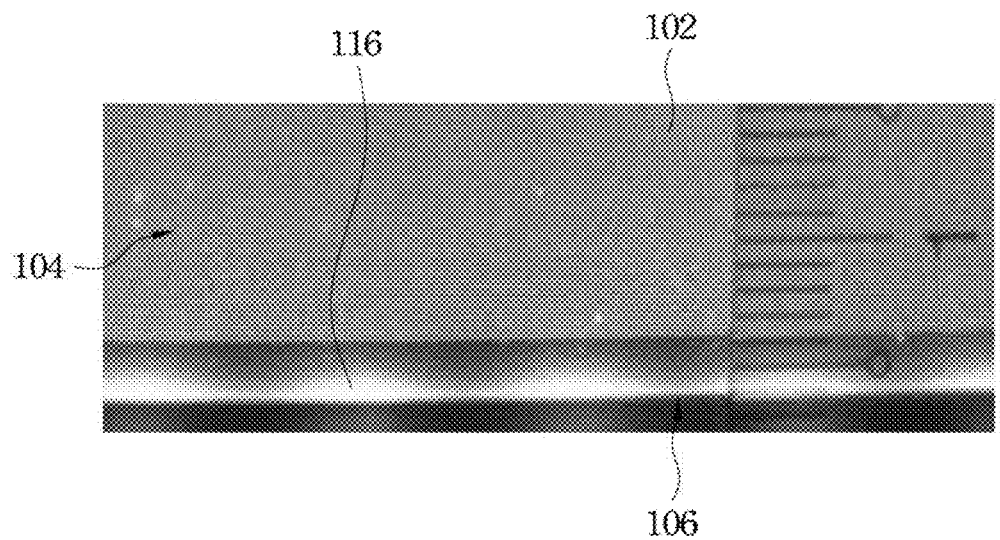
FIG. 4 is a diagram showing appearance brightness distribution on a light incidence side of a conventional backlight module.
Figure 7A:
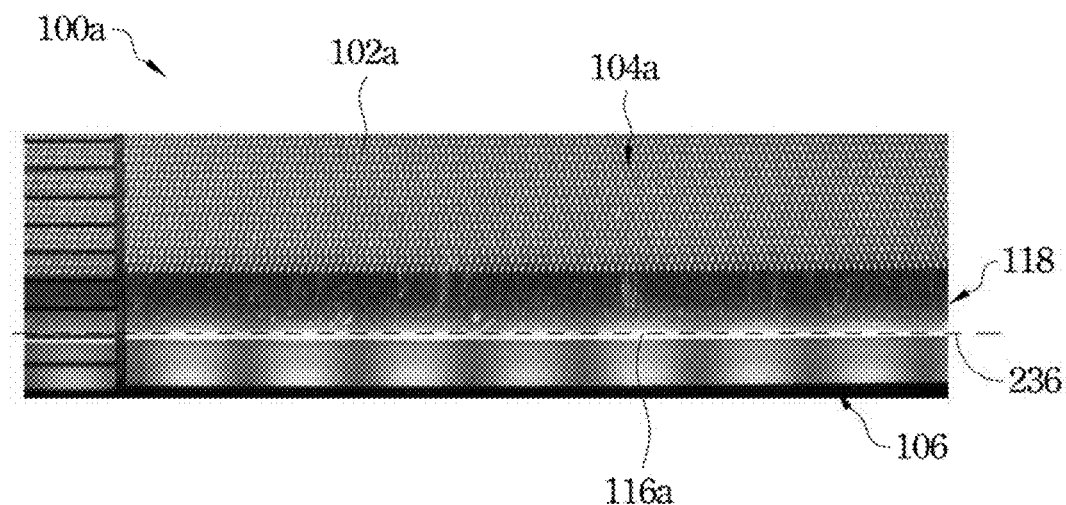
FIG. 7A is a diagram showing appearance brightness distribution on a light incidence side of the backlight module shown in FIG. 3.
Figure 7B:
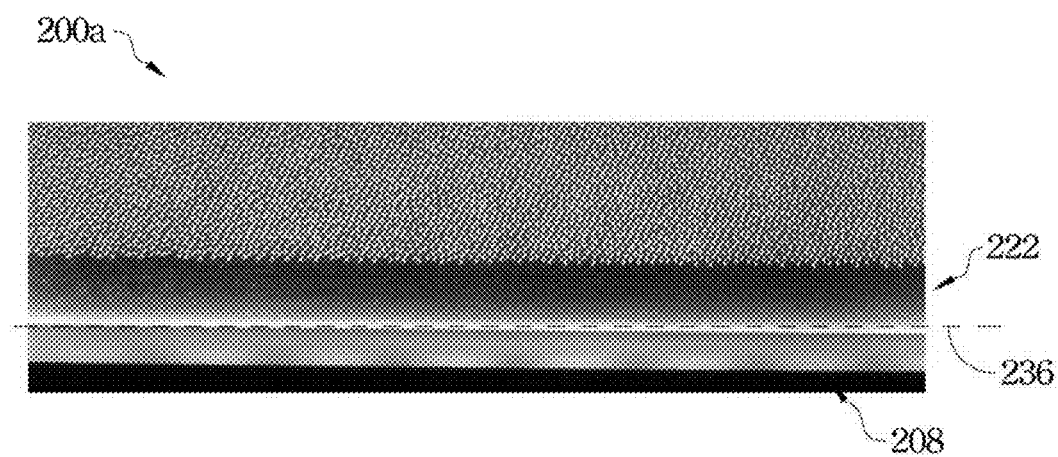
FIG. 7B is a diagram showing appearance brightness distribution on a light incidence side of the backlight module shown in FIG. 6A.
Figure 8:
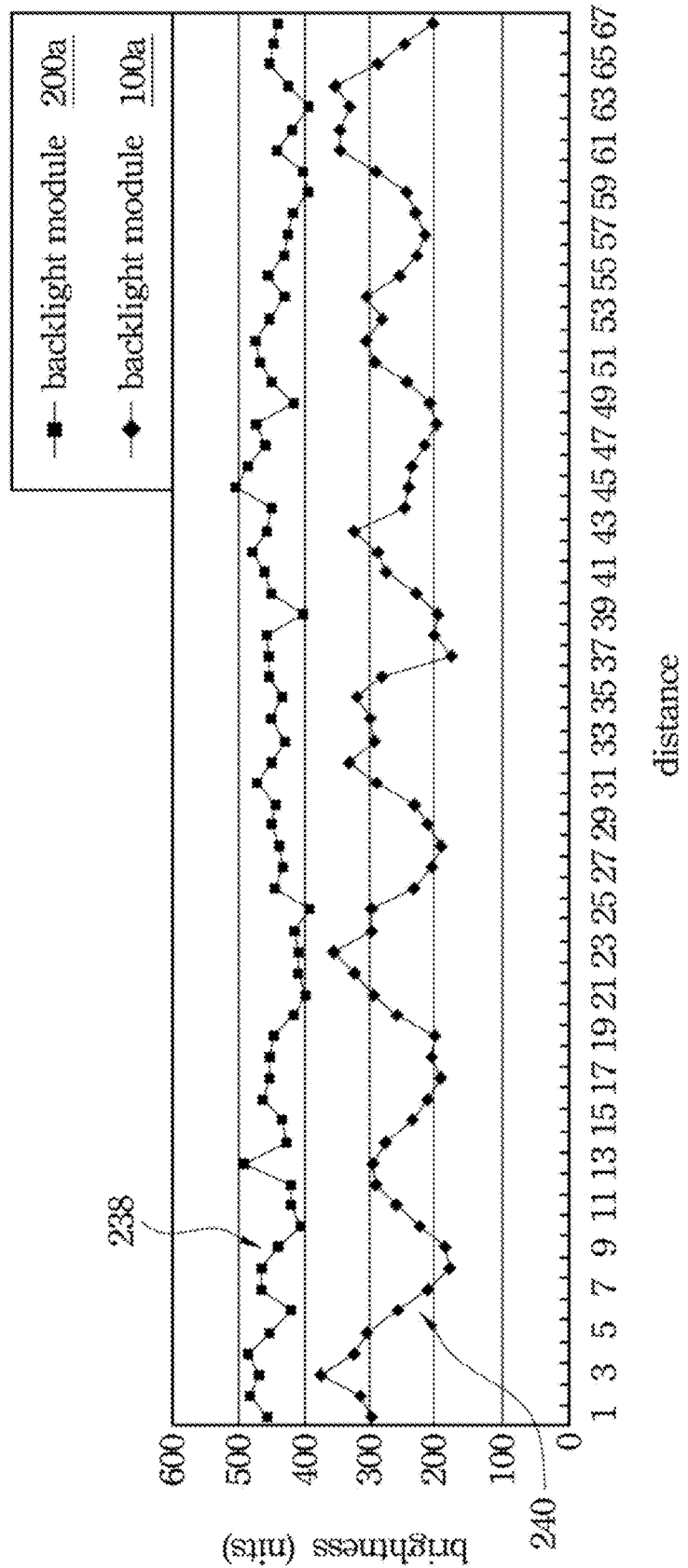
FIG. 8 is a diagram showing appearance brightness distribution curves on the incidence sides of the backlight modules shown in FIG. 7A and FIG. 7B.

Refer to FIG. 7A, FIG. 7B and FIG. 8. FIG. 7A, FIG. 7B and FIG. 8 are diagrams respectively showing appearance brightness distribution on a light incidence side of the backlight module shown in FIG. 3, appearance brightness distribution on a light incidence side of the backlight module shown in FIG. 6A, and appearance brightness distribution curves on the incidence sides of the backlight modules shown in FIG. 7A and FIG. 7B. According to FIG. 7A, it is known that the uneven brightness condition of the non-visible region 118 on the light incidence side of the conventional backlight module 100a is very serious, and the hot spots 116a are formed on the non-visible region 118. However, according to FIG. 7B, it is known that by arranging the stripe microstructures 204a parallel to the normal line of the light incidence surface 208 within the microstructure region 222 of the light-emitting surface 210 of the light guide plate 206a, the incident light of the non-visible region can be scattered, thereby can effectively blur the leakage light on the non-visible region. Accordingly, the brightness distribution of the microstructure region 222 of the backlight module 200a is obviously more uniform than that of the conventional backlight module 100a.

In addition, as shown in FIG. 8, according to the brightness distribution curves of the backlight modules 100a and 200a obtained along measure lines 236 in FIG. 7A and FIG. 7B, it is known that a brightness distribution curve 238 of the backlight module 200a is gentler, and the undulation of a brightness distribution curve 240 of the backlight module 100a is greater. It is also known that the brightness distribution of the microstructure region 222 of the backlight module 200a is more uniform than that of the conventional backlight module 100a.

Figure 9:
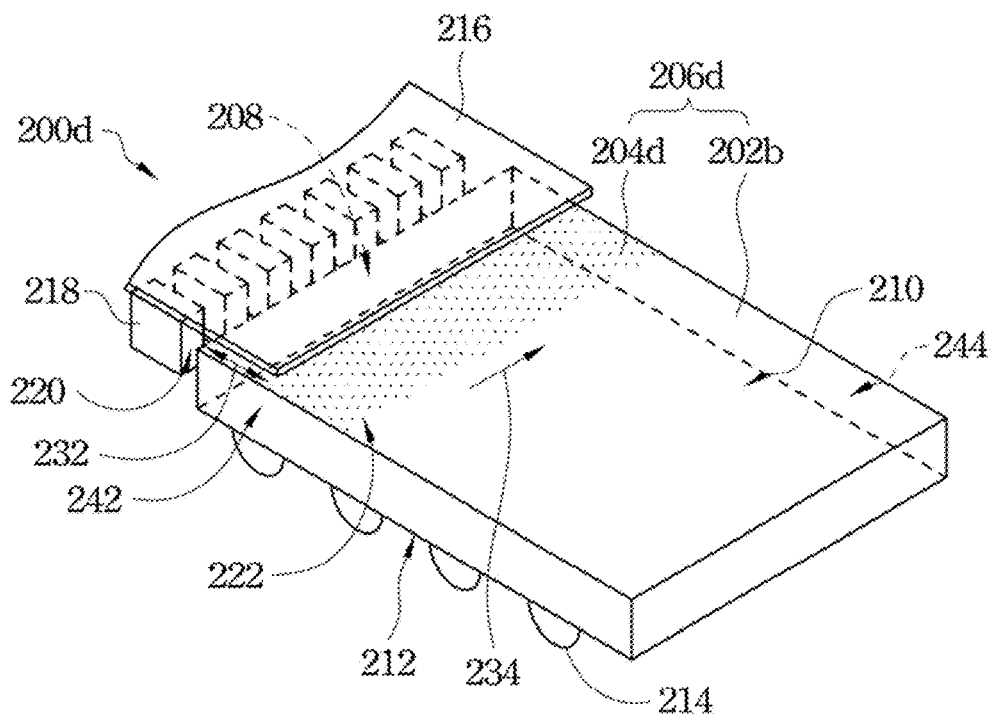
FIG. 9 illustrates a perspective view of a backlight module in accordance with further another embodiment of the present invention.

Refer to FIG. 9. FIG. 9 illustrates a perspective view of a backlight module in accordance with further another embodiment of the present invention. A structure of a backlight module 200d of the present embodiment is substantially the same as that of the backlight module 200 of the aforementioned embodiment, and differences between the two structures are that a main body 202b of a light guide plate 206d of the backlight module 200d includes a plurality of dot microstructures 204d rather than stripe microstructures 204; a microstructure region 222 of a light-emitting surface 210 of the main body 202b is separated from the light incidence surface 208 by a distance 232; and the backlight module 200d further includes a cover 216.

In the backlight module 200d, the main body 202b includes a first side surface 242 and a second side surface 244 opposite to each other. The first side surface 242, the light incidence surface 208 and the second side surface 244 are connected to three adjacent edges of the light-emitting surface 210 in sequence, i.e. the light incidence surface 208 is located between the first side surface 242 and the second side surface 244. In addition, the first side surface 242, the light incidence surface 208 and the second side surface 244 all are connected between the light-emitting surface 210 and the light reflective surface 212.

In the main body 202b, the microstructure region 222 extends from an edge of the light-emitting surface 210 connected with the first side surface 242 to another edge of the light-emitting surface 210 connected with the second side surface 244. In one exemplary example, a direction 234 of the microstructure region 222 extending on the light-emitting surface 210 from the first side surface 242 to the second side surface 244 may be perpendicular to the normal line of the light incidence surface 208. Furthermore, in one exemplary example, the distance 232 between the microstructure region 222 and the light incidence surface 208 may be greater than 0, and equal to or smaller than 20 mm, for example.

In the light guide plate 206d, the dot microstructures 204d are uniformly distributed in the whole microstructure region 222 of the light-emitting surface 210. In addition, the dot microstructures 204d may be dot diffusing structures with matted surfaces and not conoid surface structures. In some exemplary examples, the dot microstructures 204d may be sand blasting dot structures or laser dot structures formed by a sand blasting method or a laser method.

As shown in FIG. 5, the cover 216 may extend from the top of the light sources 218 to the top of the light-emitting surface 210 of the main body 202b of the light guide plate 206d, and may at least cover the light-emitting surface 220 of the light sources 218, the light incidence surface 208 of the main body 202b, and a portion of the light-emitting surface 210 near the light incidence surface 208. In one exemplary example, the cover 216 may cover a portion of the microstructure region 222. The cover 216 may have a reflection capability, and light emitted by the light sources 218 toward the cover 216 can be reflected to the light-emitting surface 210 of the main body 202b.

The emitting light of the point light sources, such as light-emitting diodes, is highly directional and narrow, and by distributing the dot microstructures 204d in the whole microstructure region 222 of the light-emitting surface 210 of the main body 202b, the light reflected by the cover 216 toward the light-emitting surface 210 can be scattered. Therefore, a spray phenomenon caused by the point light sources with high directionality can be effectively blurred by the dot microstructures 204d. Accordingly, brightness on a light incidence side of the light guide plate 206d is uniformed to further uniform brightness of a light-emitting surface of the backlight module 200d.

Figure 10:
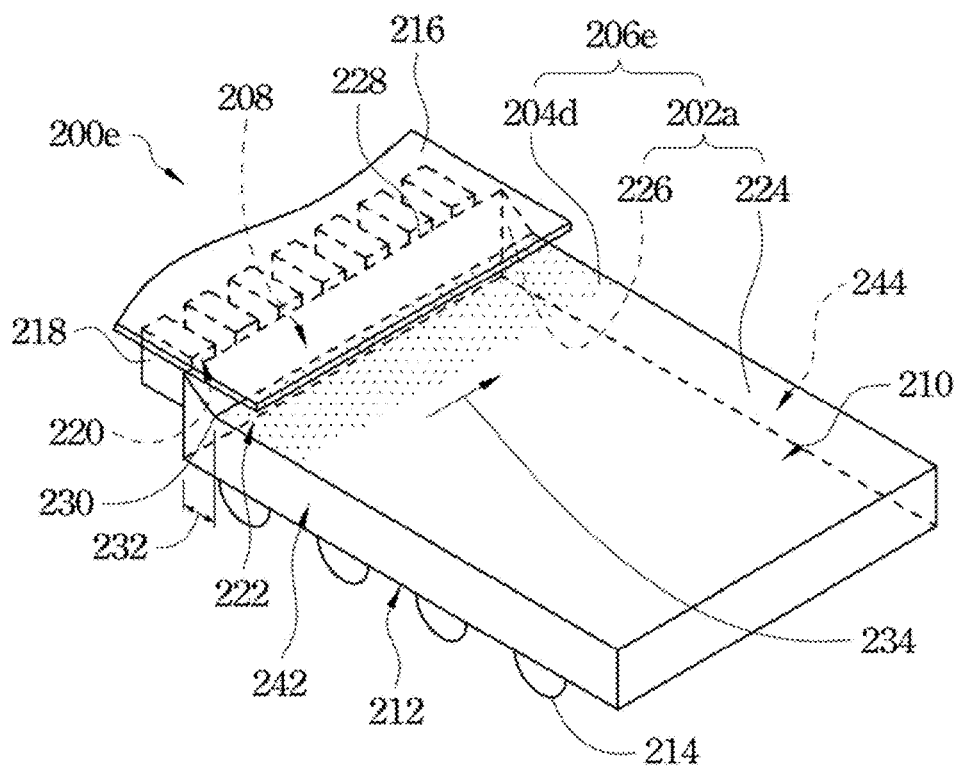
FIG. 10 illustrates a perspective view of a backlight module in accordance with still yet another embodiment of the present invention.

Refer to FIG. 10. FIG. 10 illustrates a perspective view of a backlight module in accordance with still yet another embodiment of the present invention. A structure of a backlight module 200e of the present embodiment is substantially the same as that of the backlight module 200d of the aforementioned embodiment, and a difference between the two structures is that a main body 202a of a light guide plate 206e of the backlight module 200e is not a flat plate with a uniform thickness.

In the backlight module 200e, the light guide plate 206e is similar to the light guide plate 206a shown in FIG. 6A, and includes a tapered portion 226 and the flat plate portion 224. The tapered portion 226 has a first end 228 and a second end 230 opposite to each other. The thickness of the tapered portion 226 is gradually decreased from the first end 228 to the second end 230, i.e. the first end 228 of the tapered portion 226 is thicker than the second end 230. In addition, the flat plate portion 224 extends from the second end 230 of the tapered portion 226 along the normal line of the light incidence surface 208. A thickness of the flat plate portion 224 is the same as that of the second end 230 of the tapered portion 226. In the present embodiment, the microstructure region 222 is located on the flat plate portion 224 and does not extend to the tapered portion 226.

Figure 11:
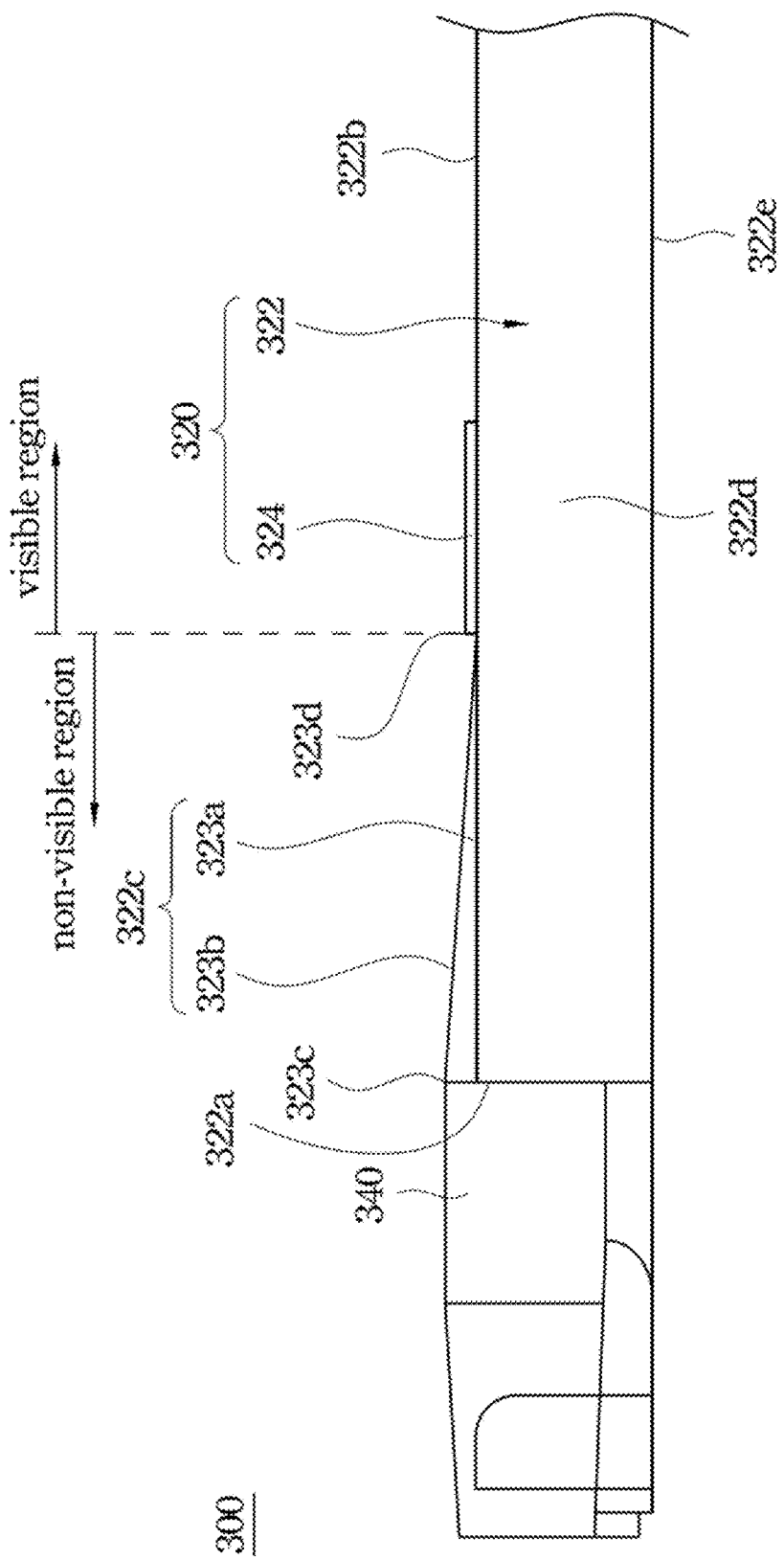
FIG. 11 illustrates a side view of a backlight module in accordance with still yet another embodiment of the present invention.
Figure 12:
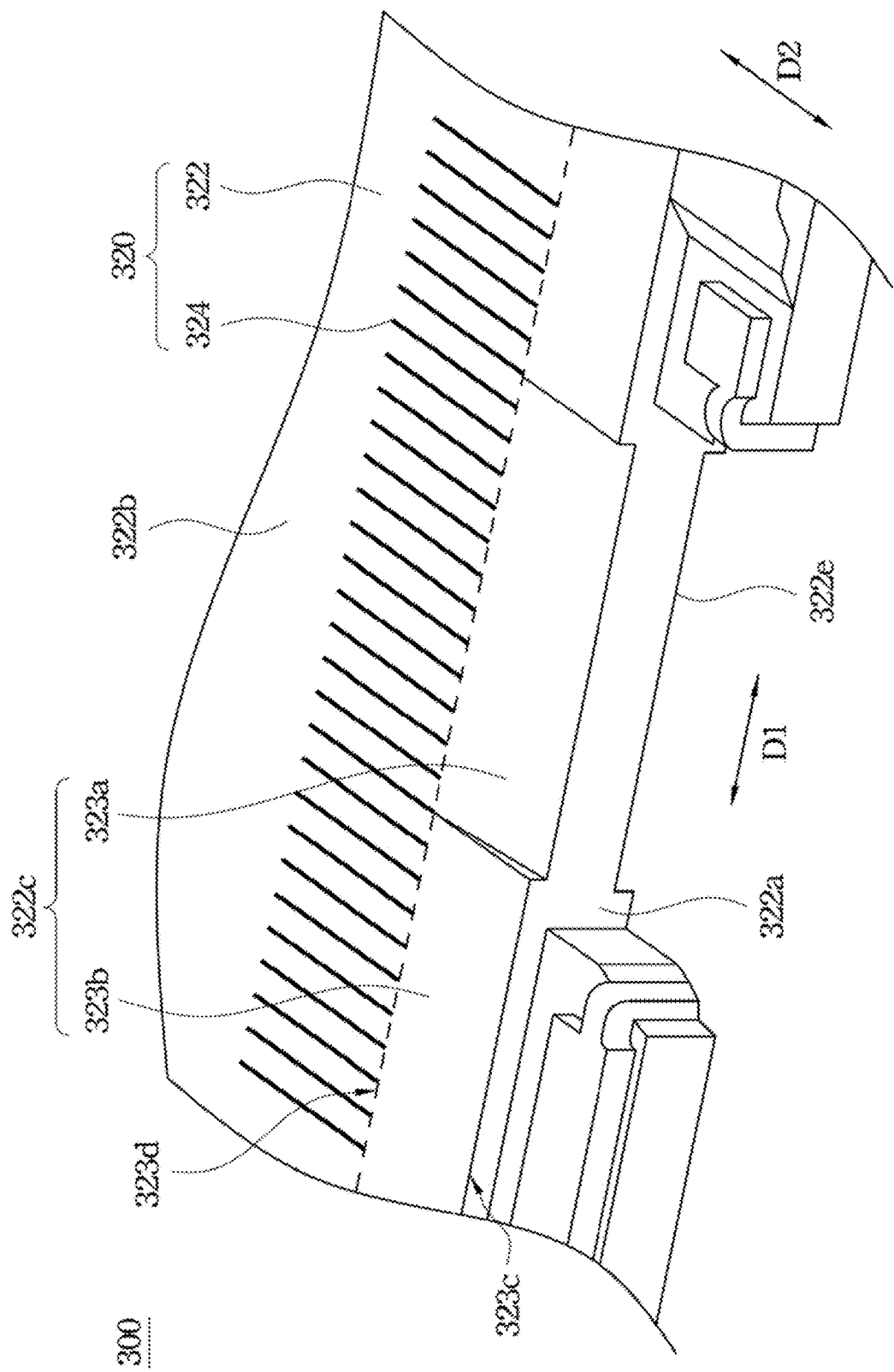
FIG. 12 illustrates a perspective view of the backlight module shown in FIG. 1I.

Refer to FIG. 11 and FIG. 12. FIG. 11 and FIG. 12 respectively illustrate a side view of and a perspective view of a backlight module 300 in accordance with still yet another embodiment of the present invention. In the present embodiment, the backlight module 300 mainly includes a light guide plate 320 and various light sources 340. The light guide plate 320 includes a main body 322 and various stripe microstructures 324 disposed on the main body 322. The main body 322 includes a light incidence surface 322a, an optical surface 322b, a tapered portion 322c, and a flat plate portion 322d. The tapered portion 322c is adjacent to the light incidence surface 322a, and the optical surface 322b is located on the flat plate portion 322d. In the present embodiment, the optical surface 322b is a light-emitting surface. In other embodiments, the optical surface 322b is a reflecting surface.

Referring to FIG. 11 and FIG. 12 again, in the present embodiment, the stripe microstructures 324 are arranged on the main body 322. Moreover, at least portions of the stripe microstructures 324 are located at the optical surface 322b, and each of the stripe microstructures 324 is trimmed between the light incidence surface 322a and an opposite side of the main body 322. In one embodiment, a length of each of the stripe microstructures 324 is smaller than a length of the main body 322. As shown in FIG. 11 and FIG. 12, the tapered portion 322c has a first end 323c and a second end 323d opposite to each other. The thickness of the tapered portion 322c is gradually decreased from the first end 323c to the second end 323d, i.e. the first end 323c of the tapered portion 322c is thicker than the second end 323d. In addition, the tapered portion 322c includes a flat surface 323a and various inclined portions 323b. The inclined portions 323b are arranged on the flat surface 323a along a direction D1. The direction D1 is different from an extending direction D2 of the stripe microstructures 324. In one exemplary example, the direction D1 is vertical to the extending direction D2.

Figure 1:
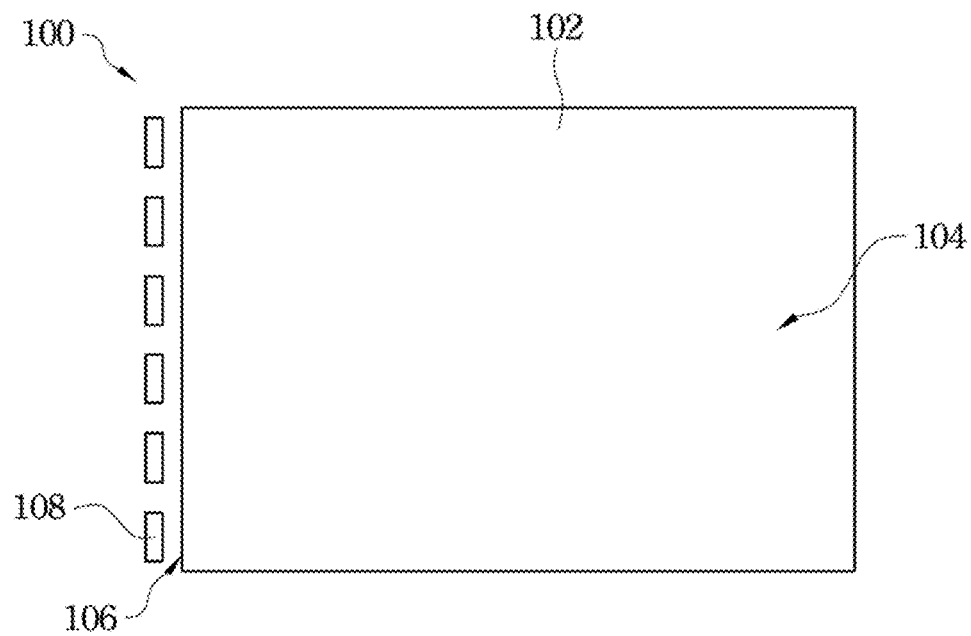
FIG. 1 illustrates a top view of an arrangement of a light guide plate and light-emitting diodes of a conventional backlight module.
Figure 2:
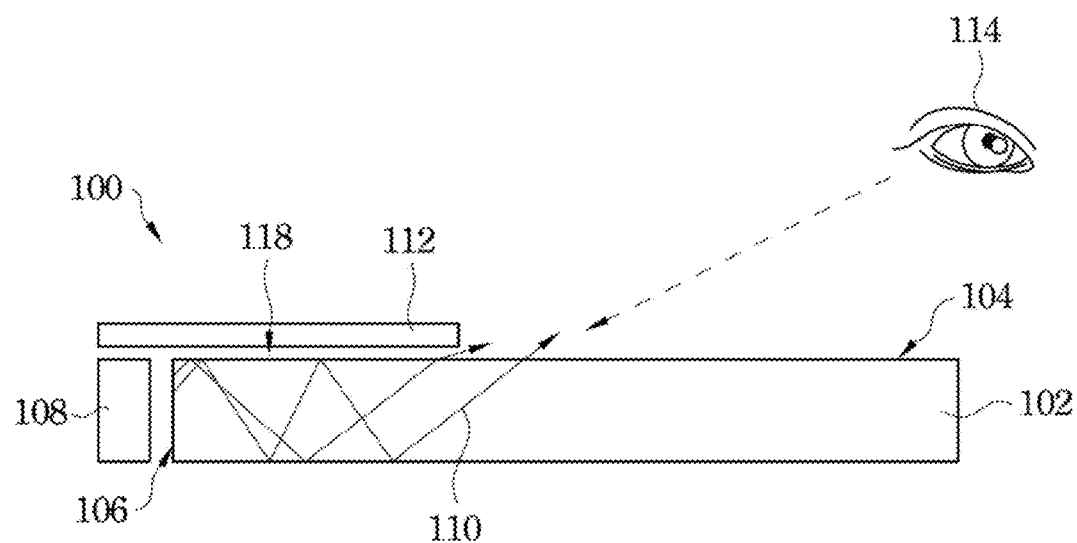
FIG. 2 illustrates a side view of the conventional backlight module.

In the present embodiment, the main body 322 has a surface 322e opposite to the optical surface 322b. In the present embodiment, a distance between the flat surface 323a and surface 322e is equal to a distance between the surface 322e and the optical surface 322b. In the present embodiment, there are a first side edge and a second side edge respectively on a top and a bottom of the tapered portion 322c, and the first side edge is separated from the optical surface 322b. As shown in FIG. 1 and FIG. 12, each of the stripe microstructures 324 extends from the second side edge and trimmed between the light incidence surface 322a and an opposite side of the main body 322. In other words, one end of each of the stripe microstructures 324 is connected to the second side edge of the tapered portion 322c, and the other end of the stripe microstructures 324 is located on the optical surface 322b. In the present embodiment, as shown in FIG. 11, the backlight module 300 has a visible region and a non-visible region. The visible region is aligned with the second side edge of the tapered portion 322c, and each of the stripe microstructures 324 is located in the visible region and extends from the second side edge of the tapered portion 322c towards the opposite side of the main body 322.

Figure 13:
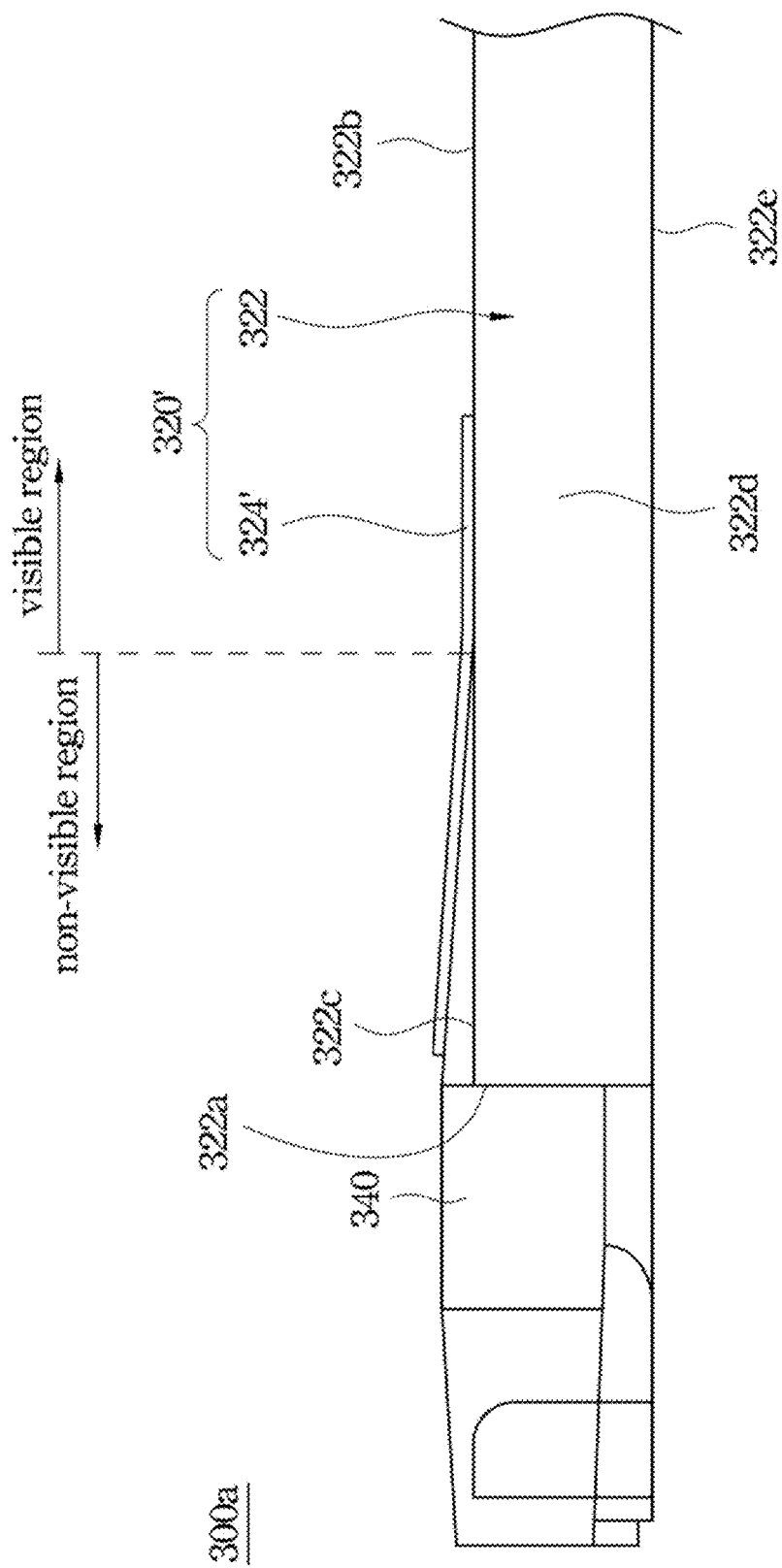
FIG. 13 illustrates a side view of a backlight module in accordance with still yet another embodiment of the present invention.

Refer to FIG. 13. FIG. 13 illustrates a side view of a backlight module 300a in accordance with still yet another embodiment of the present invention. A structure of the backlight module 300a of the present embodiment is substantially the same as that of the backlight module 300 of the aforementioned embodiment, and a difference between the two structures is that stripe microstructures 324' of a light guide plate 320' in the backlight module 300a extend from the tapered portion 322c until the stripe microstructures 324' are trimmed on the optical surface 322b between the light incidence surface 322a and an opposite side of the main body 322. In other words, one end of each of the stripe microstructures 324' is located on the tapered portion 322c, and the other end of the stripe microstructures 324' is located on the optical surface 322b. In the present embodiment, as shown in FIG. 13, the backlight module 300a has a visible region and a non-visible region. One portion of each of the stripe microstructures 324' which is located on the tapered portion is in the non-visible region, and the other portion of each of the stripe microstructures 324' which is located on the optical surface 322b is in the visible region.

Figure 14:
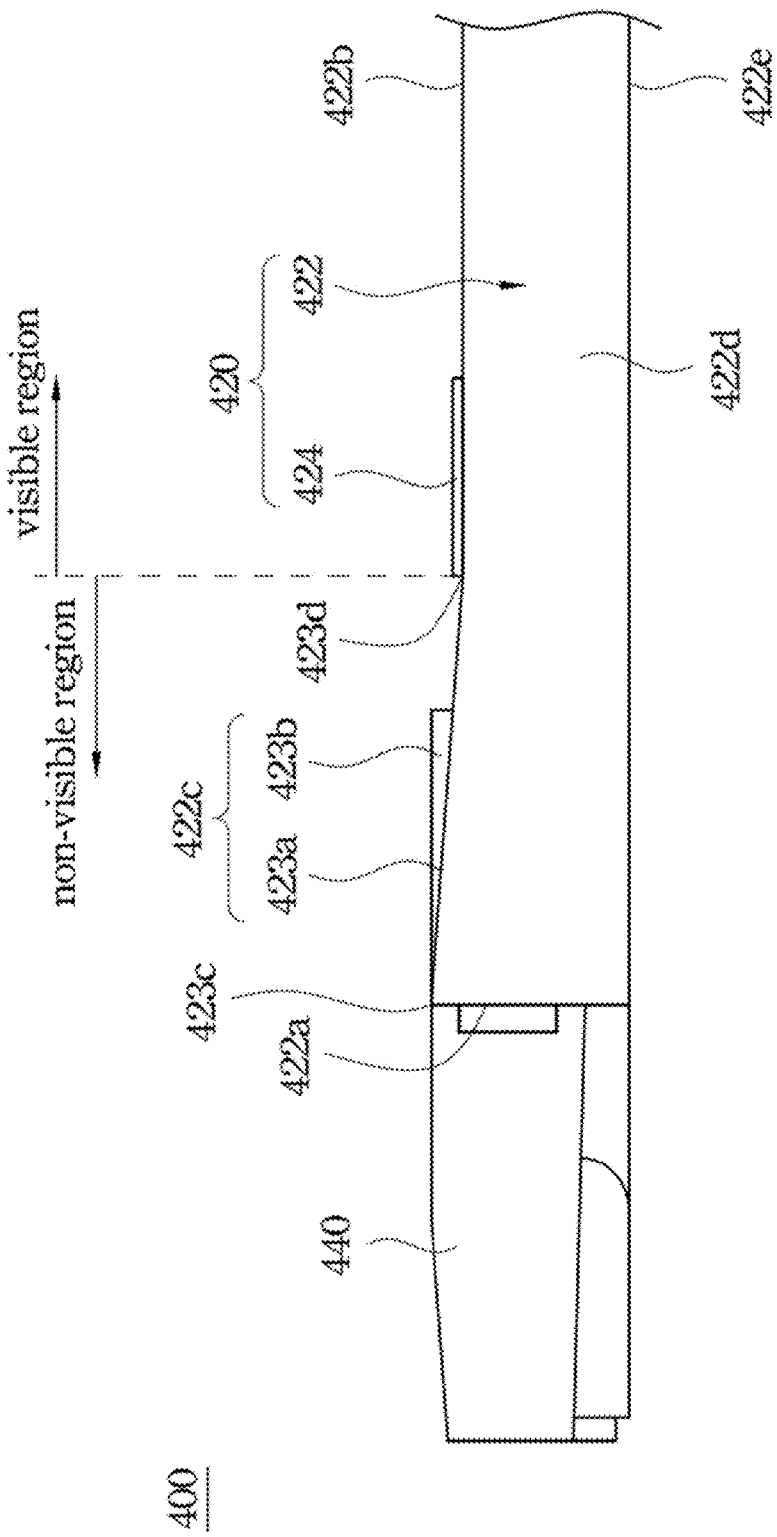
FIG. 14 illustrates a side view of a backlight module in accordance with still yet another embodiment of the present invention.
Figure 15:
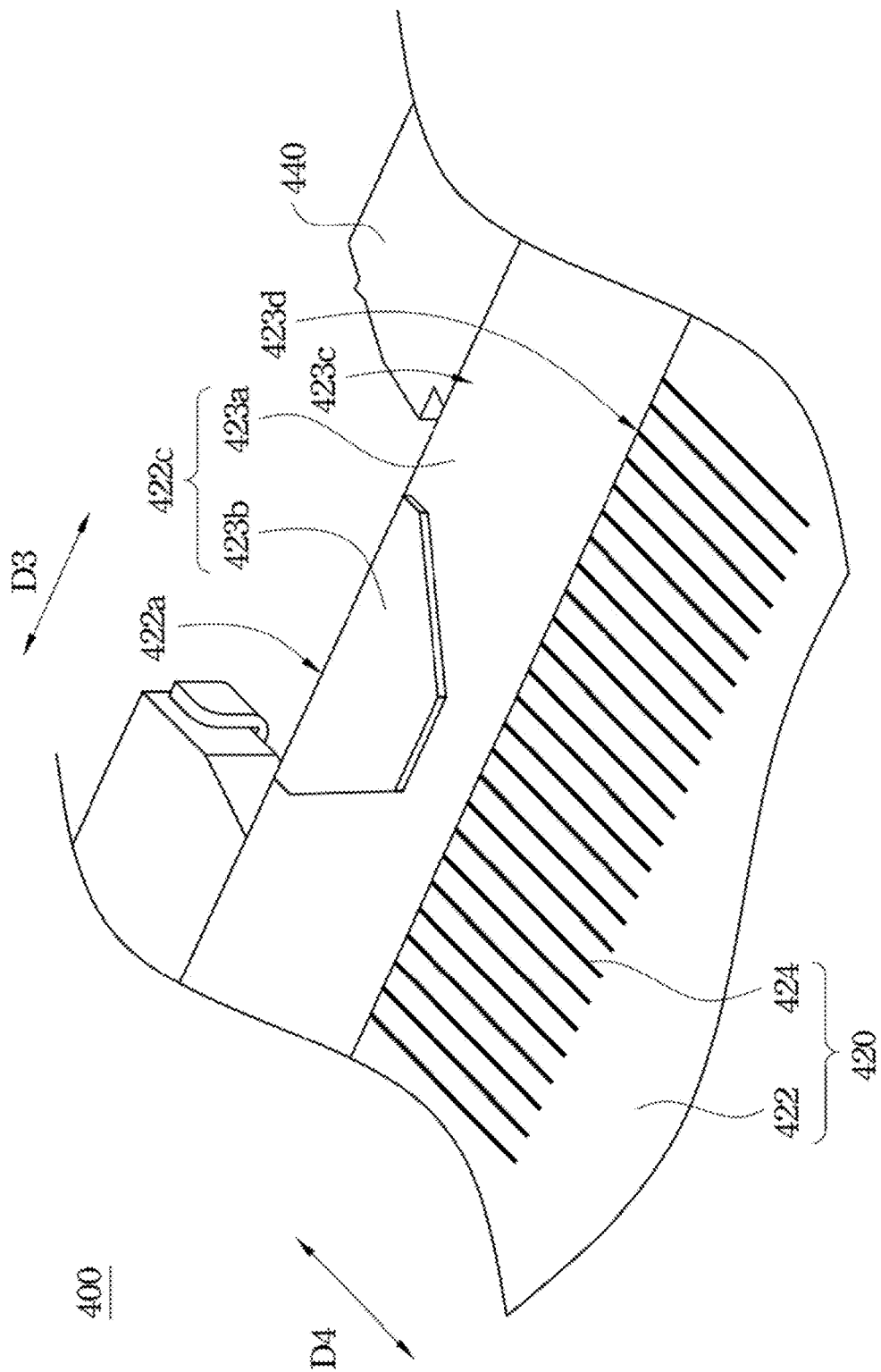
FIG. 15 illustrates a perspective view of the backlight module shown in FIG. 14.

Refer to FIG. 14 and FIG. 15. FIG. 14 and FIG. 15 respectively illustrate a side view of and a perspective view of a backlight module 400 in accordance with still yet another embodiment of the present invention. In the present embodiment, the backlight module 400 mainly includes a light guide plate 420 and various light sources 440. The light guide plate 420 includes a main body 422 and various stripe microstructures 424 disposed on the main body 422. The main body 422 includes a light incidence surface 422a, an optical surface 422b, a tapered portion 422c, and a flat plate portion 422d. The tapered portion 422c is adjacent to the light incidence surface 422a, and the optical surface 422b is located on the flat plate portion 422d. In the present embodiment, the optical surface 422b is a light-emitting surface. In other embodiments, the optical surface 422b is a reflecting surface.

Referring to FIG. 14 and FIG. 15 again, in the present embodiment, the stripe microstructures 424 are arranged on the main body 422. Moreover, at least portions of the stripe microstructures 424 are located at the optical surface 422b, and each of the stripe microstructures 424 is trimmed between the light incidence surface 422a and an opposite side of the main body 422. In one embodiment, a length of each of the stripe microstructures 424 is smaller than a length of the main body 322. As shown in FIG. 13 and FIG. 14, the tapered portion 422c has a first end 423c and a second end 423d opposite to each other. The thickness of the tapered portion 422c is gradually decreased from the first end 423c to the second end 423d, i.e. the first end 423c of the tapered portion 422c is thicker than the second end 423d. In addition, the tapered portion 422c includes an inclined surface 423a and various platforms 423b. The platforms 423b are arranged on the inclined surface 423a along a direction D3. The direction D3 is different from an extending direction D4 of the stripe microstructures 424. In one exemplary example, the direction D3 is vertical to the extending direction D4.

As shown in FIG. 14, in the present embodiment, the main body 422 has a surface 422e opposite to the optical surface 422b. In the present embodiment, a distance between a flat surface of the platforms 423b and surface 422e is greater than a distance between the surface 422e and the optical surface 422b. In the present embodiment, there are a first side edge and a second side edge respectively on a top and a bottom of the tapered portion 422c, and the flat surface of the platforms 423b is separated from the optical surface optical surface 422b, preferably, the surface of each platform 423b is parallel to the optical surface 422b of the main body 422. As shown in FIG. 14 and FIG. 15, each of the stripe microstructures 424 extends from the second side edge and trimmed between the light incidence surface 422a and an opposite side of the main body. In other words, one end of each of the stripe microstructures 424 is connected to the second side edge of the tapered portion 422c, and the other end of the stripe microstructures 424 is located on the optical surface 322b. In the present embodiment, as shown in FIG. 14, the backlight module 400 has a visible region and a non-visible region. Moreover, the whole portion of each of the stripe microstructures 424 is located in the visible region instead of extending towards the non-visible region.

Figure 16:
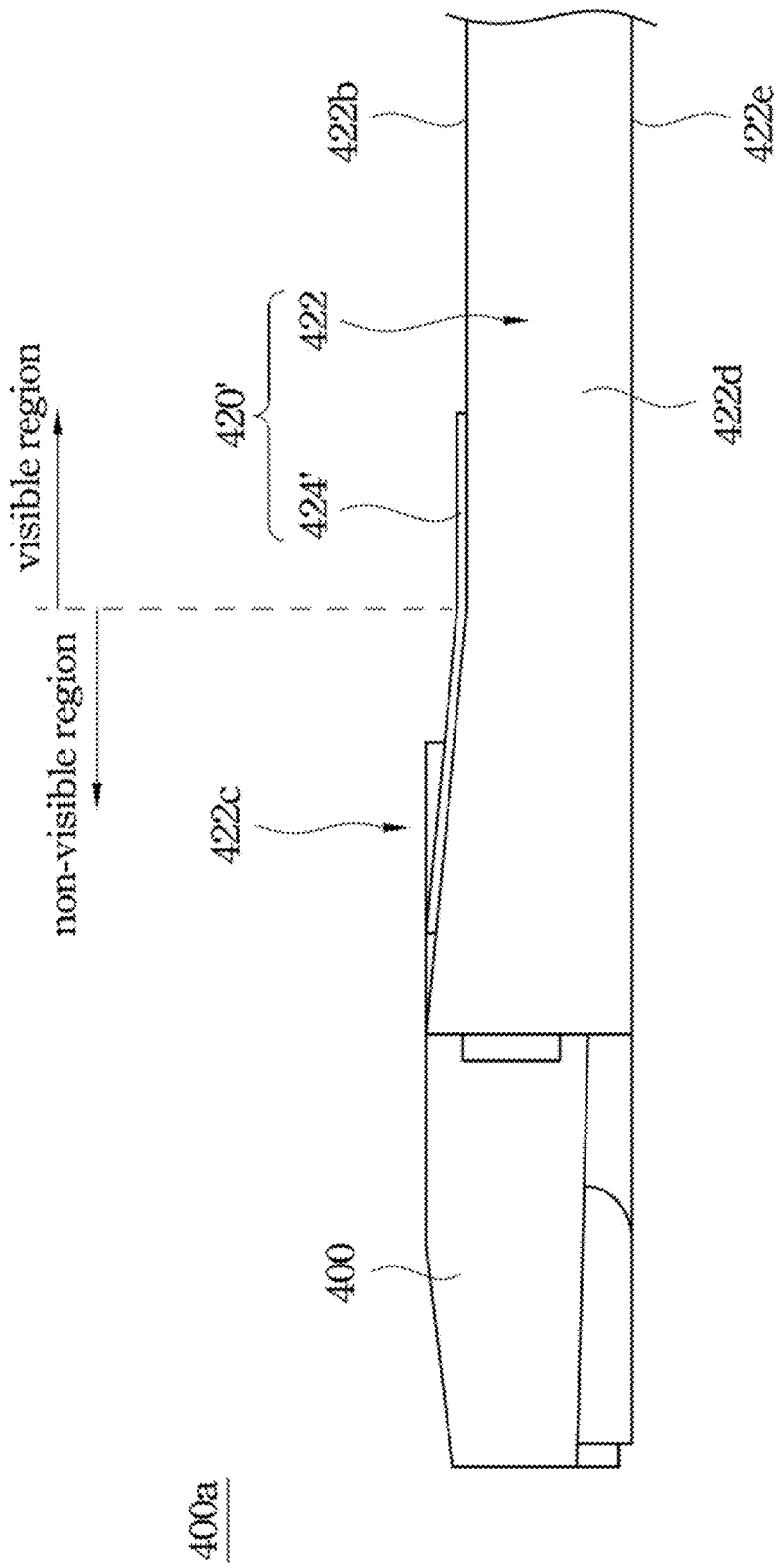
FIG. 16 illustrates a side view of a backlight module in accordance with still yet another embodiment of the present invention.

Refer to FIG. 16. FIG. 16 illustrates a side view of a backlight module 400a in accordance with still yet another embodiment of the present invention. A structure of the backlight module 400a of the present embodiment is substantially the same as that of the backlight module 400 of the aforementioned embodiment, and a difference between the two structures is that stripe microstructures 424' of a light guide plate 420' in the backlight module 400a extend from the tapered portion 422c until the stripe microstructures 424' are trimmed on the optical surface 422b between the light incidence surface 422a and an opposite side of the main body 422. In other words, one end of each of the stripe microstructures 424' is located on the tapered portion 422c, and the other end of the stripe microstructures 424' is located on the optical surface 422b. In the present embodiment, as shown in FIG. 16, the backlight module 400a has a visible region and a non-visible region. One portion of each of the stripe microstructures 424' which is located on the tapered portion is in the non-visible region, and the other portion of each of the stripe microstructures 424' which is located on the optical surface 422b is in the visible region.

In some embodiments, the stripe microstructures can be disposed according to the location of the visible region and the non-visible region of the backlight module. For example, as shown in FIG. 11 and FIG. 14, the visible region is aligned with the second side edge of the tapered portion 322c and 422c, and each of the stripe microstructures 324 and 424 extends from the second side edge of the tapered portion 322c and 422c. In other embodiments, the visible region can be separated from the tapered portion.

Figure 17:
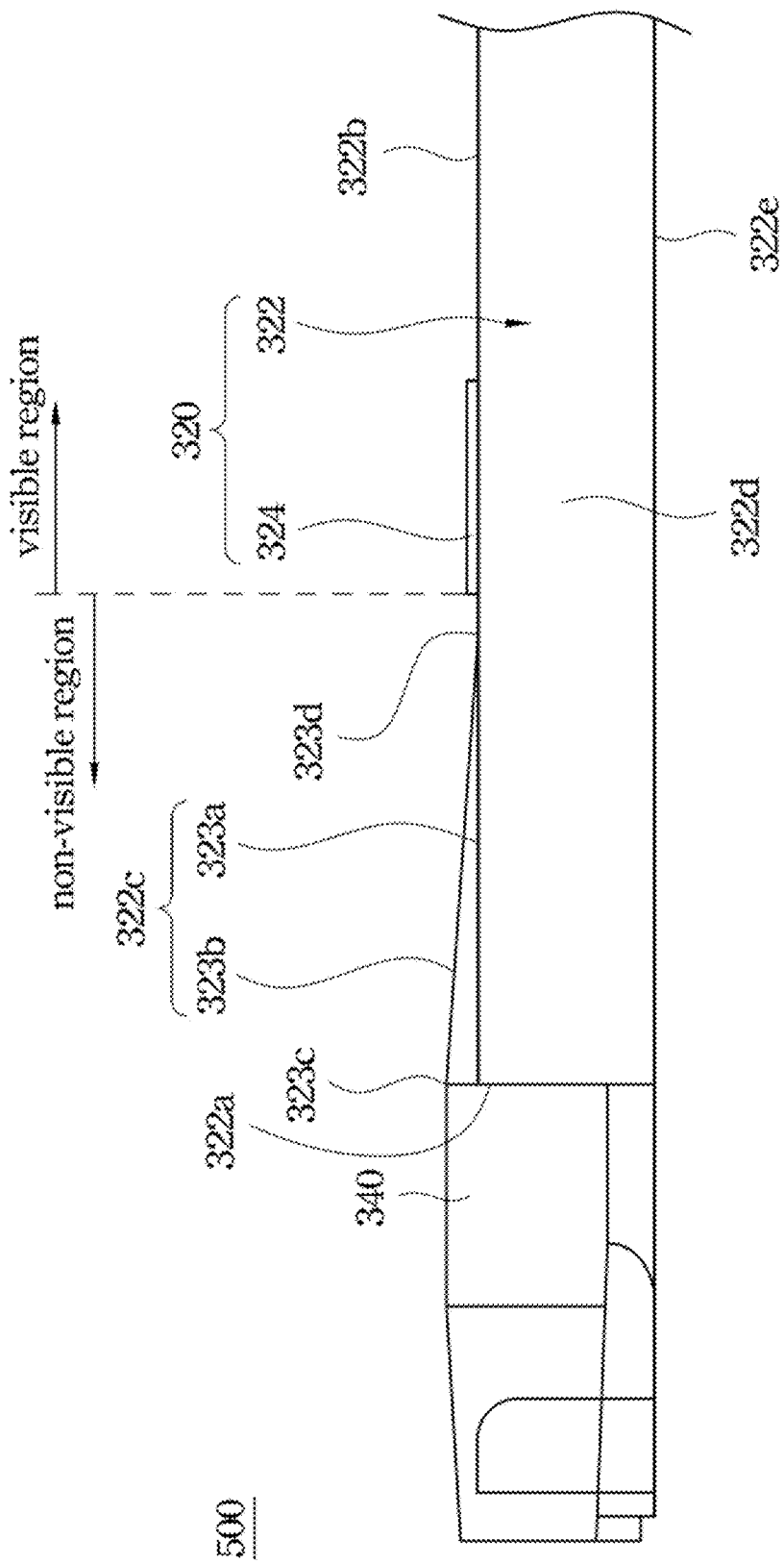
FIG. 17 illustrates a side view of a backlight module in accordance with still yet another embodiment of the present invention.
Figure 18:
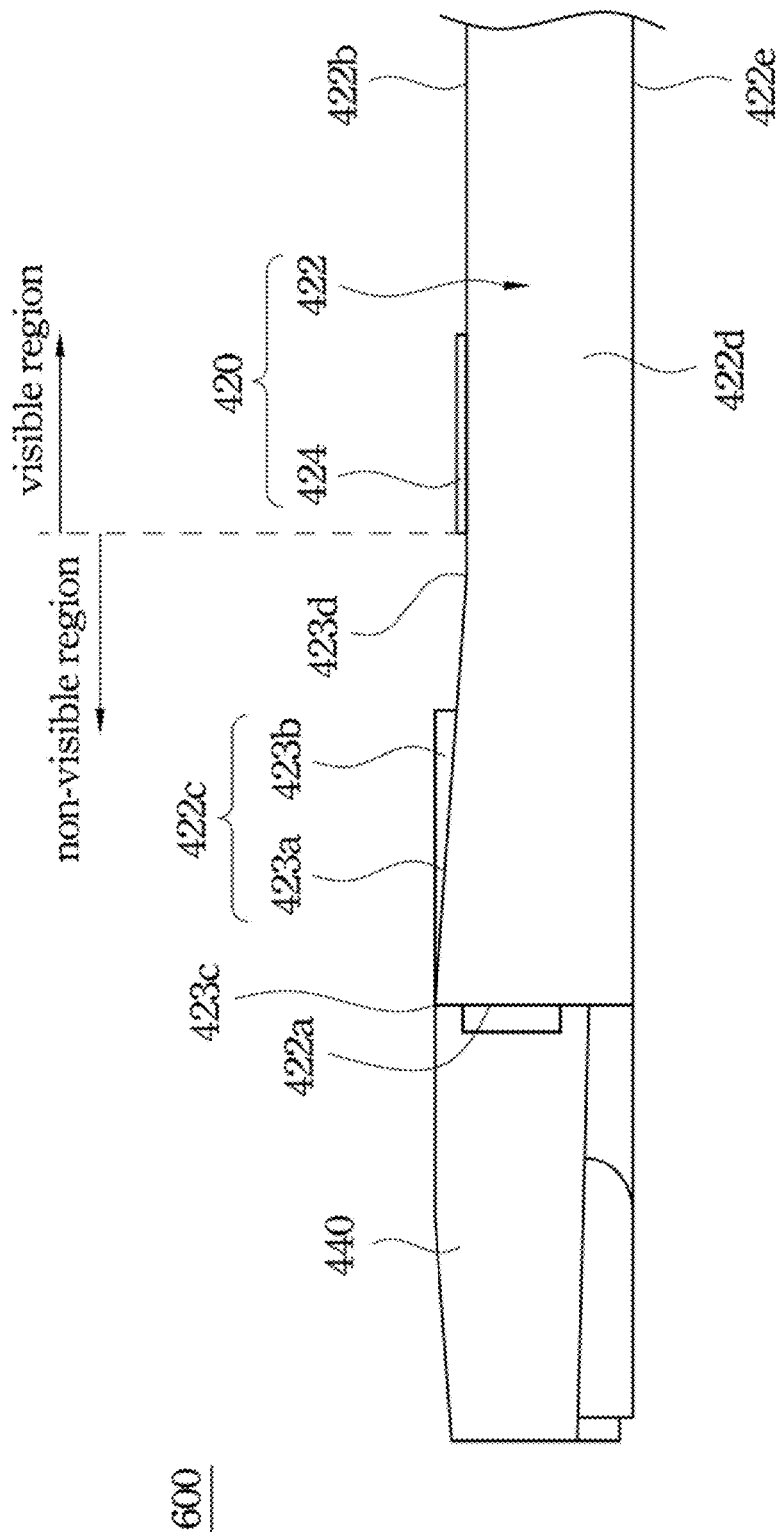
FIG. 18 illustrates a side view of a backlight module in accordance with still yet another embodiment of the present invention.

Referring to FIG. 17 and FIG. 18, FIG. 17 and FIG. 18 respectively illustrate two side views of two types of backlight modules 500 and 600 in accordance with still yet another embodiment of the present invention. As shown in FIG. 17, a structure of the backlight module 500 of the present embodiment is substantially the same as that of the backlight module 300 of the aforementioned embodiment, and a difference between the two structures is that the backlight modules 500 has a visible region a non-visible region, and the visible region is separated from the second end 323d of tapered portion 322c. In the present embodiment, each of the stripe microstructures 324 is separated from the second end 323d of the tapered portion 322c.

As shown in FIG. 18, a structure of the backlight module 600 of the present embodiment is substantially the same as that of the backlight module 400 of the aforementioned embodiment, and a difference between the two structures is that the backlight modules 600 has a visible region a non-visible region, and the visible region is separated from the second end 423d of tapered portion 422c. In the present embodiment, each of the stripe microstructures 424 is separated from the second end 423d of the tapered portion 422c.

Figure 19:
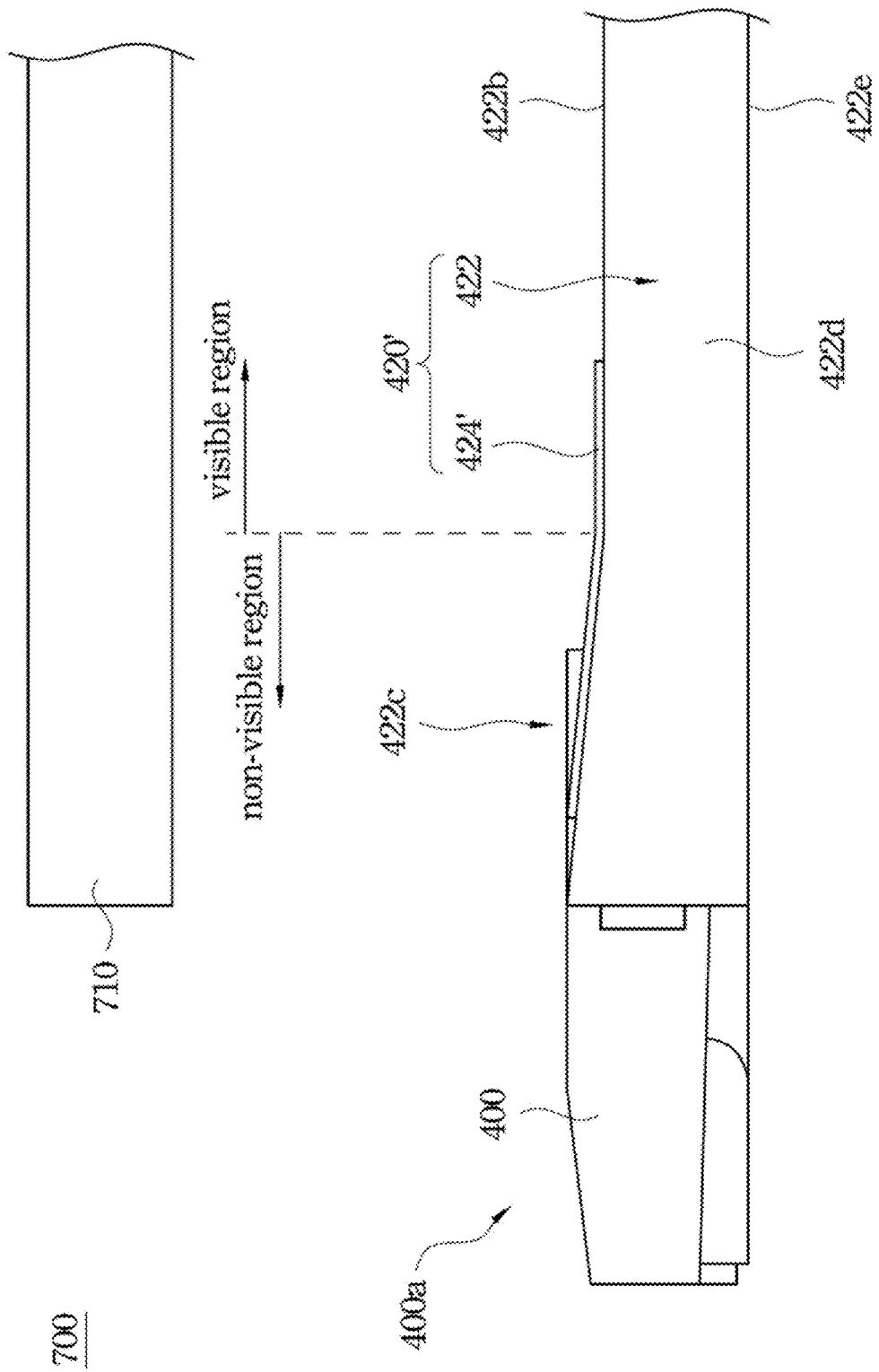
FIG. 19 illustrates a side view of a display device in accordance with still yet another embodiment of the present invention.

Referring to FIG. 19, FIG. 19 illustrates a side view of a display device 700 in accordance with still yet another embodiment of the present invention. The display device 700 in the present embodiment includes the backlight module 400a and a display panel 710. As shown in FIG. 19, the display panel 710 is disposed in front of the main body 422 of the light guide plate 420. Light beam emitted from optical surface 422b of the light guide plate 420 can enter the display panel 710, so as to achieve the aforementioned objects. It is noted that, the backlight module 400a is merely used as an example for explanation in the present embodiment. In other embodiments, other backlight modules as described above can be also applied to the display device 700.

According to the aforementioned embodiments of the present invention, advantages of the present invention are that a microstructure region of a light-emitting surface of a light guide plate near a light incidence surface is set with a plurality of stripe microstructures, which are parallel to a normal line of the light incidence surface, and the stripe microstructures can scatter incident light of a non-visible region, so that leakage light on the non-visible region can be effectively blurred to greatly improve an uneven brightness phenomenon in the non-visible region. Therefore, brightness uniformity of the backlight module can be enhanced.

According to the aforementioned embodiments of the present invention, another advantage of the present invention is that many dot microstructures are distributed in a microstructure region of a light guide plate near a light incidence surface and lengthwise crossing a light-emitting surface. The dot microstructures can blur light reflected back to a light-emitting surface of the light guide plate, so that a spray phenomenon caused by point light sources with high directionality can be greatly improved.

Figure 20:
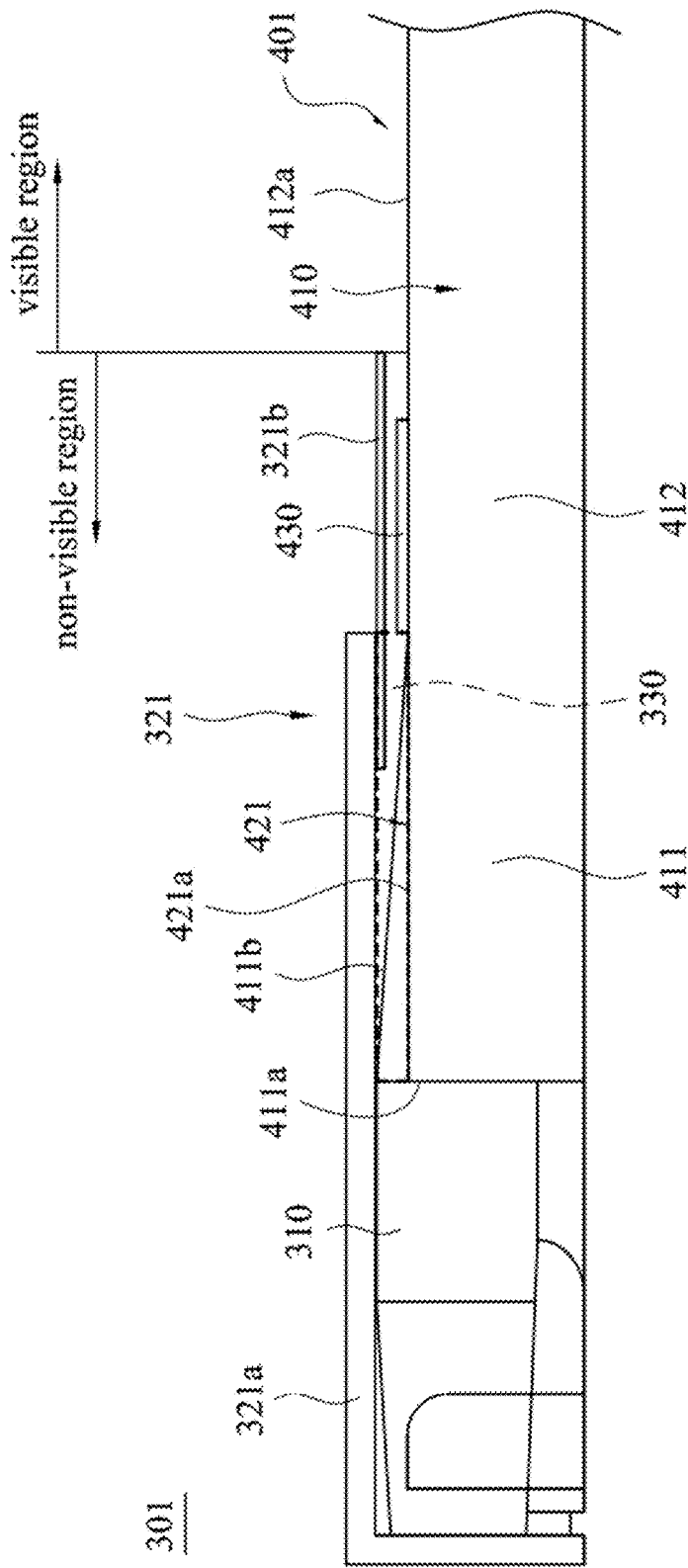
FIG. 20 illustrates a side view of a backlight module in accordance with a first embodiment of the present invention.

Referring to FIG. 20, FIG. 20 illustrates a side view of a backlight module 301 in accordance with a first embodiment of the present invention. The backlight module 301 of the present embodiment mainly includes a light guide plate 401, a light source 310 disposed adjacent to the light guide plate 401, a component 321 and plural adhesive members 330. The light guide plate 401 includes a main body 410 and plural platform portions 421. In the present embodiment, the component 321 has a frame 321a and a reflecting film 321b, in which the reflecting film 321b is connected to the frame 321a and is located between the frame 321a and the main body 410. The adhesive members 330 are disposed on the platform portions 421 of light guide plate 401, so as to adhere the light guide plate 401 to the component 321. In the present embodiment, the light guide plate 401 is adhered on the frame 321a of the component 321 by the adhesive member 330.

Figure 21:
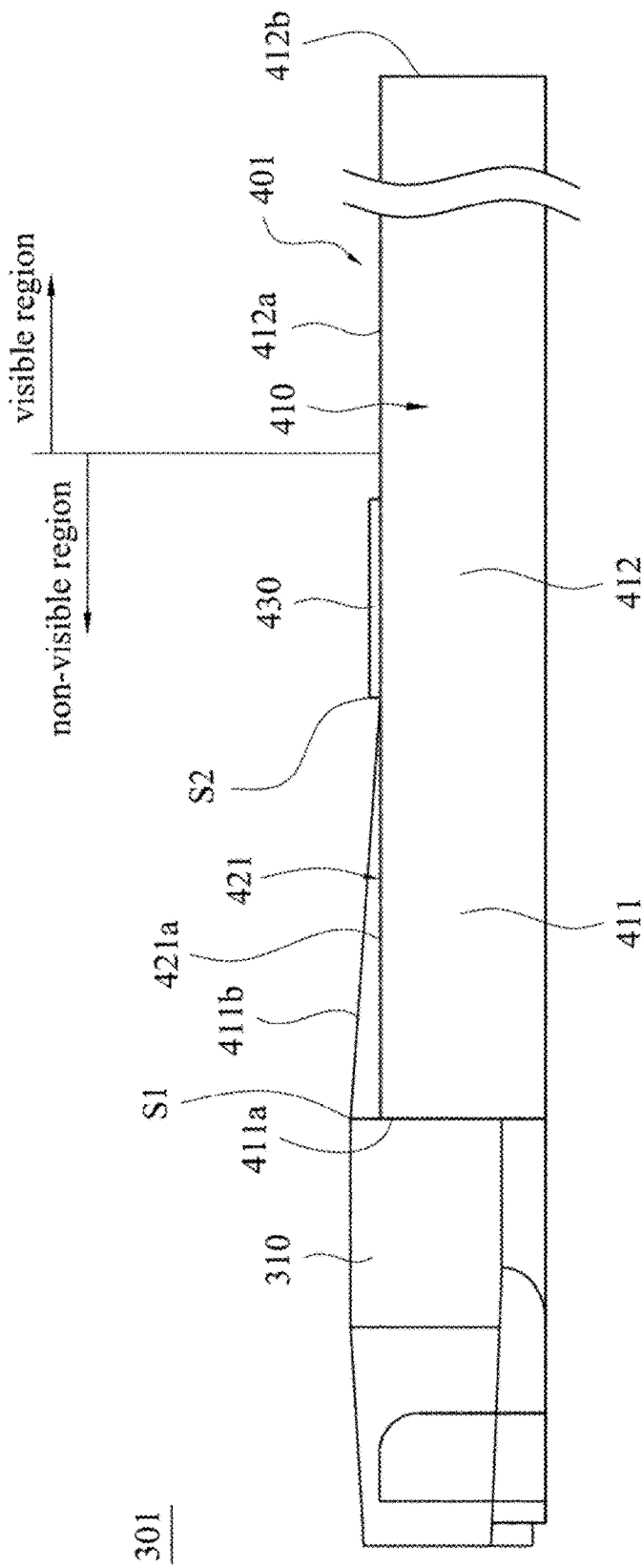
FIG. 21 illustrates a side view of the backlight module with omission of a component and adhesive members in accordance with the first embodiment of the present invention.
Figure 22:
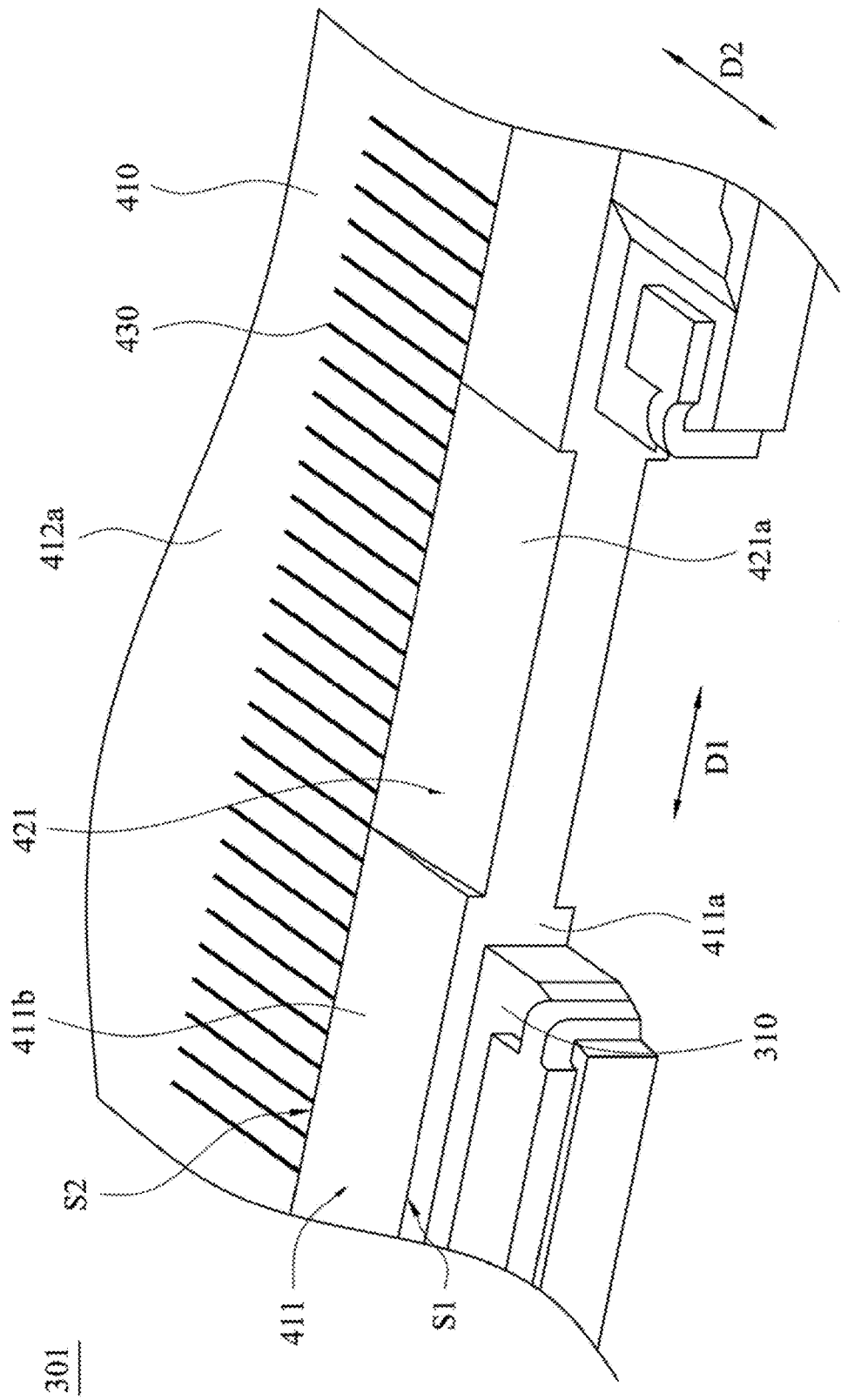
FIG. 22 illustrates a perspective view of the backlight module with omission of the component and the adhesive members in accordance with the first embodiment of the present invention.

Referring to FIG. 21 and FIG. 22, FIG. 21 and FIG. 22 illustrate a side view and a perspective view of the backlight module 301 with omission of the component 321 and adhesive members 330 in accordance with the first embodiment of the present invention. The main body 410 of the light guide plate 401 includes a tapered portion 411 and a light guide portion 412. The tapered portion 411 has a light incidence surface 411a and an inclined surface 411b, in which the light incidence surface 411a is located on a side of the tapered portion 411 which has greater thickness, and the inclined surface 411b is connected to the light incidence surface 411a. The light guide portion 412 is connected to a side of the tapered portion 411 which has smaller thickness, and the light guide portion 412 is a flat plate with a uniform thickness. The light guide portion 412 has an optical surface 412a, and the optical surface 412a is connected to the inclined surface 411b. As shown in FIG. 20, in the present embodiment, the reflecting film 321b covers a portion of the tapered portion 411 of the main body 410 and extends on the light guide portion 412.

Referring to FIG. 21 and FIG. 22 again, the platform portions 421 are disposed on the tapered portion 411, and each of the platform portions 421 has a flat surface 421a. In one example, the platform portions 421 are arranged along a first direction D1. In addition, as shown in the side view of the light guide plate 401 (i.e. FIG. 21), the flat surface 421a of each of the platform portions 421 and the optical surface 412a are located at the same plane. In the present embodiment, the adhesive members 330 shown in FIG. 20 can be disposed on the flat surfaces 421a, so that the light guide plate 401 can be adhered to the component 321 by the adhesive members 330.

Figure 36:
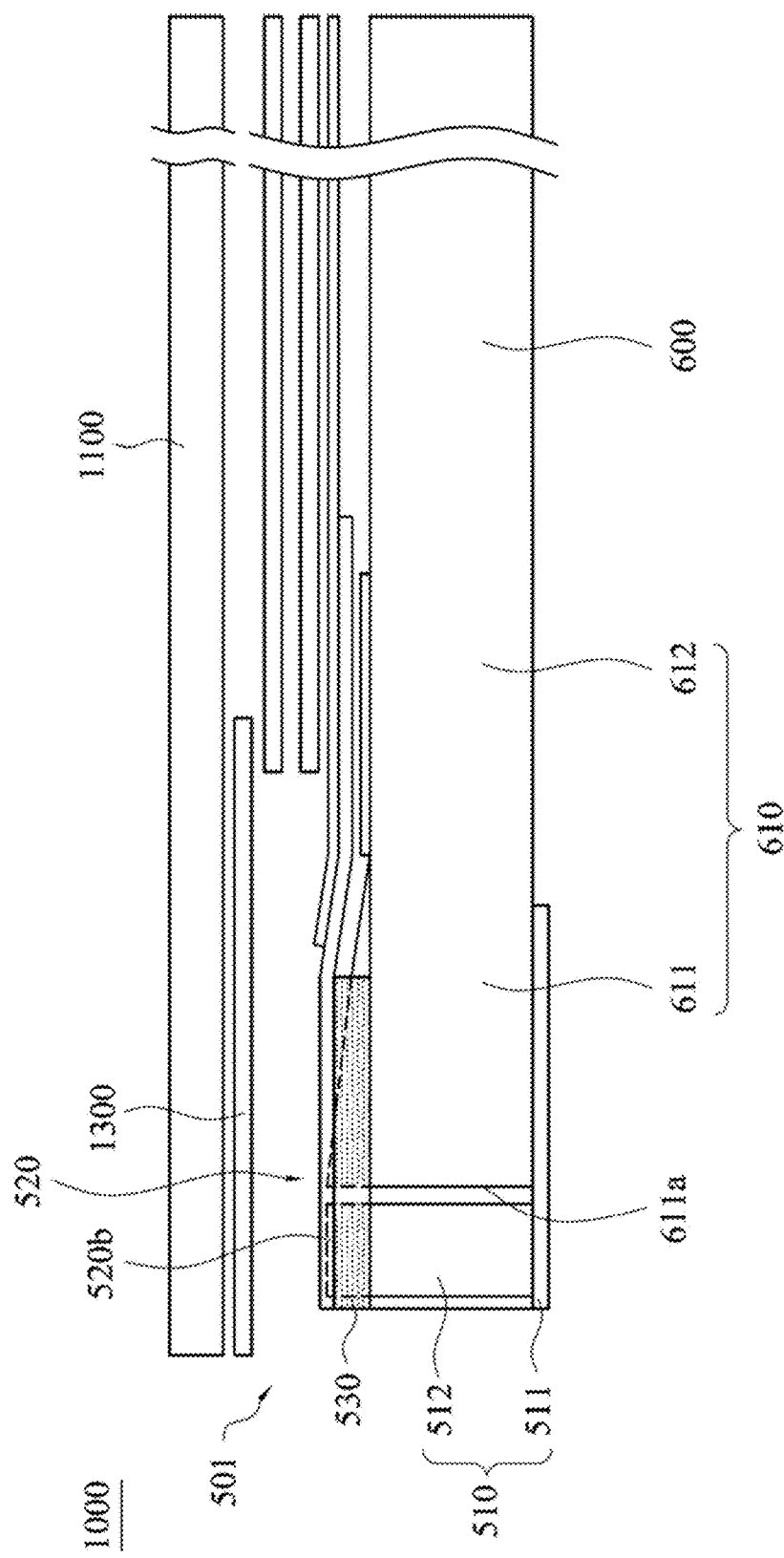
FIG. 36 illustrates a side view of a display device in accordance with an embodiment of the present invention.

As shown in FIG. 21 and FIG. 22, in the present embodiment, the light guide plate 401 further includes stripe microstructures 430 disposed on the main body 410, and a length of each of the stripe microstructures 430 is smaller than a length of the main body 410. In addition, the tapered portion 411 has a first edge S1 on the top and a second edge S2 on the bottom. The second edge S2 is connected to the optical surface 412a, and the first edge S1 is spaced from the optical surface 412a at a distance in a thickness direction of the light guide plate 401. In the present embodiment, each of the stripe microstructures 430 extends from the second edge S2 towards a direction away from the light incidence surface 411a and is trimmed on the optical surface 412a between the light incidence surface 411a and an opposite surface 412b of the light guide portion 412. In other words, one end of each of the stripe microstructures 430 is connected to the second edge S2 of the tapered portion 411, the other end of each of the stripe microstructures 430 is located on optical surface 412a. In the present embodiment, the portion of each of the stripe microstructures 430 located at the optical surface 412a is parallel to a second direction D2. The second direction D2 is referred to as a direction which is parallel to a normal line of the light incidence surface 411a. In one example, the second direction D2 is vertical to the first direction D1. On the other hand, as shown in FIG. 21, the backlight module 301 of the present embodiment has a visible region and a non-visible region. The "visible region" is a portion of the optical surface 412a of the main body 410 which can be used as a backlight source, so as to be applied to a display panel 1100 as shown in FIG. 36. The "non-visible region" is a portion of the optical surface 412a of the main body 410 which cannot be used as a backlight source. In the present embodiment, each of the stripe microstructures 430 is located in the non-visible region and extends from the second edge S2 towards the opposite surface 412b of the light guide portion 412.

Figure 23:
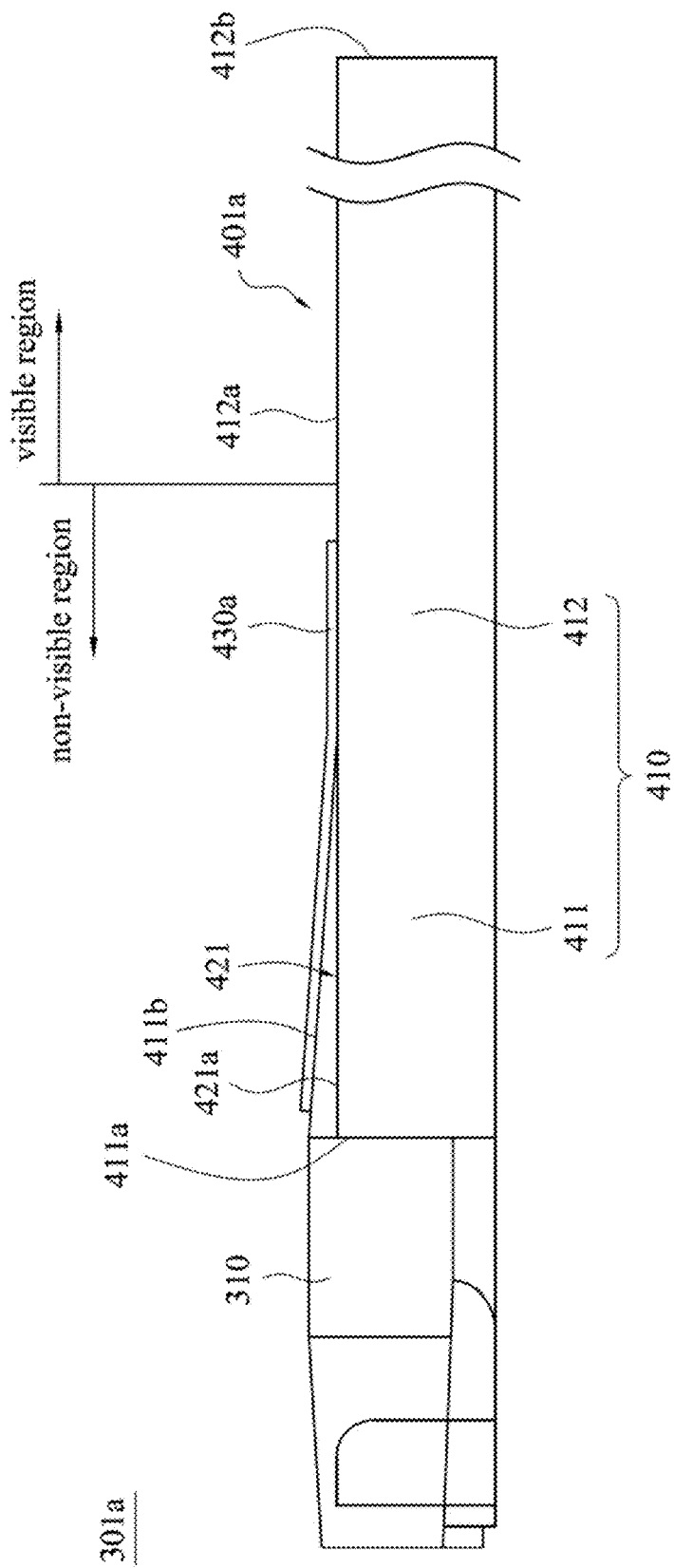
FIG. 23 illustrates a side view of a backlight module with omission of a component and adhesive members in accordance with a second embodiment of the present invention.

Referring to FIG. 23, FIG. 23 illustrates a side view of a backlight module 301a with omission of a component and adhesive members in accordance with a second embodiment of the present invention. The structure of the backlight module 301a shown in FIG. 23 is similar to the structure of the aforementioned backlight module 301, and the main difference therebetween is that stripe microstructures 430a of a light guide plate 401a of the backlight module 301a have different structures. In the present embodiment, each of the stripe microstructures 430a extends from the tapered portion 411 to the optical surface 412a and is trimmed on the light guide portion 412 between the light incidence surface 411a and the opposite surface 412b. In other words, one end of each of the stripe microstructures 430a is located on the tapered portion 411, the other end of each of the stripe microstructures 430a is located on the optical surface 412a. In the present embodiment the backlight module 301a has a visible region and a non-visible region. Both of the portion of each of the stripe microstructures 430a located on the tapered portion 411 and the portion of each of the stripe microstructures 430a located on the optical surface 412a are located in the non-visible region. In the present embodiment, light guide plate 401a also can be adhered to the component 321 shown in FIG. 20 by disposing the adhesive members 330 shown in FIG. 20 on the platform portions 421 of the light guide plate 401a.

Figure 24:
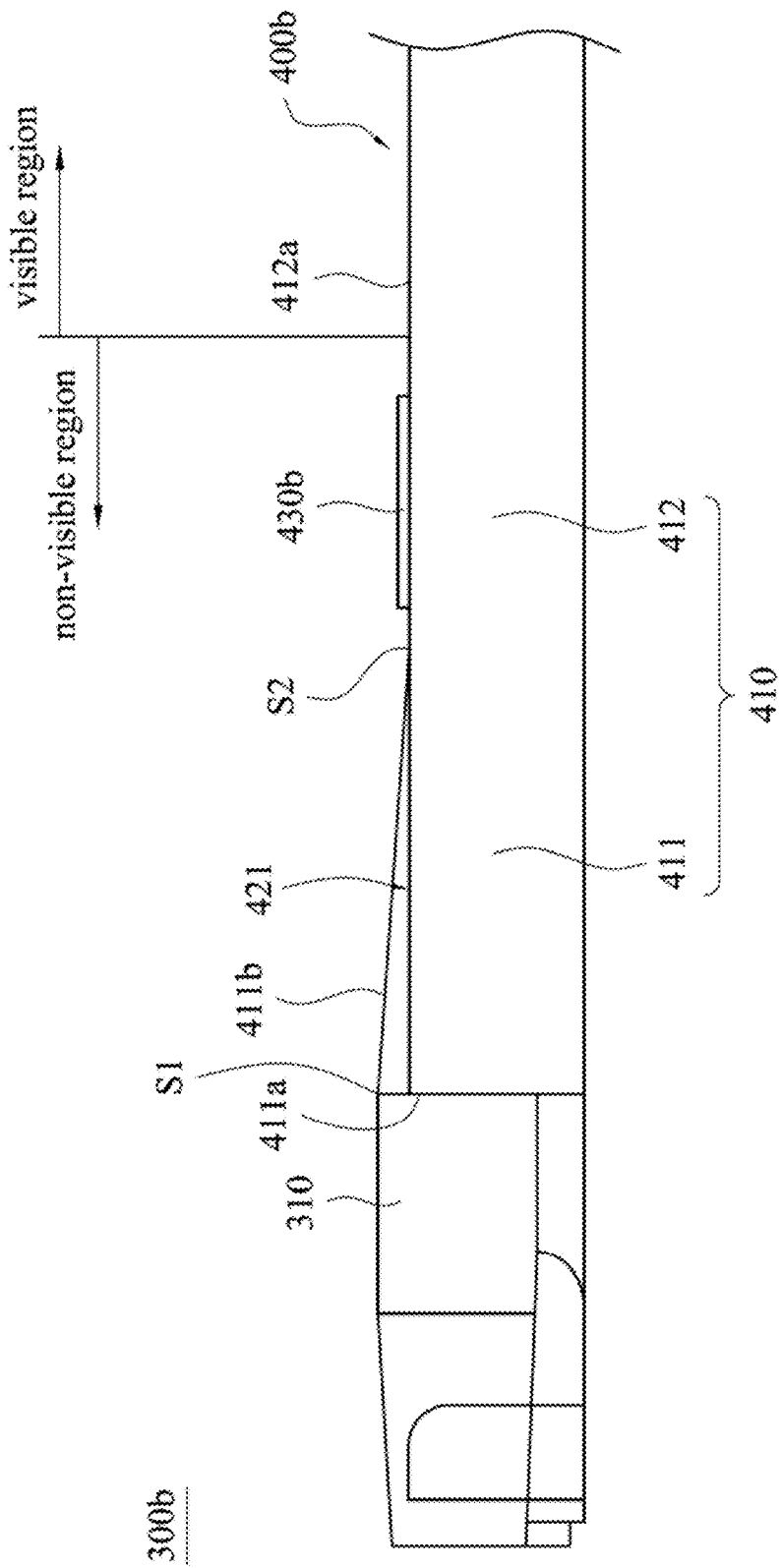
FIG. 24 illustrates a side view of a backlight module with omission of a component and adhesive members in accordance with a third embodiment of the present invention.

As shown in FIG. 24, FIG. 24 illustrates a side view of a backlight module 300b with omission of a component and adhesive members in accordance with a third embodiment of the present invention. The structure of the backlight module 300b shown in FIG. 24 is similar to the structure of the aforementioned backlight module 301, and the main difference therebetween is that stripe microstructures 430b of a light guide plate 400b of the backlight module 300b have different disposition positions. As shown in FIG. 24, the backlight module 300b has a visible region and a non-visible region. The tapered portion 411 is located in the non-visible region, and the second edge S2 of the tapered portion 411 is separated from the visible region at a distance. In the present embodiment, the stripe microstructures 430b are disposed on the optical surface 412a and are located in the non-visible region. Moreover, the stripe microstructures 430b are separated from the visible region at a distance. In the present embodiment, the light guide plate 400b also can be adhered to the component 321 shown in FIG. 20 by disposing the adhesive members 330 shown in FIG. 20 on the platform portions 421 of the light guide plate 400b.

Figure 25:
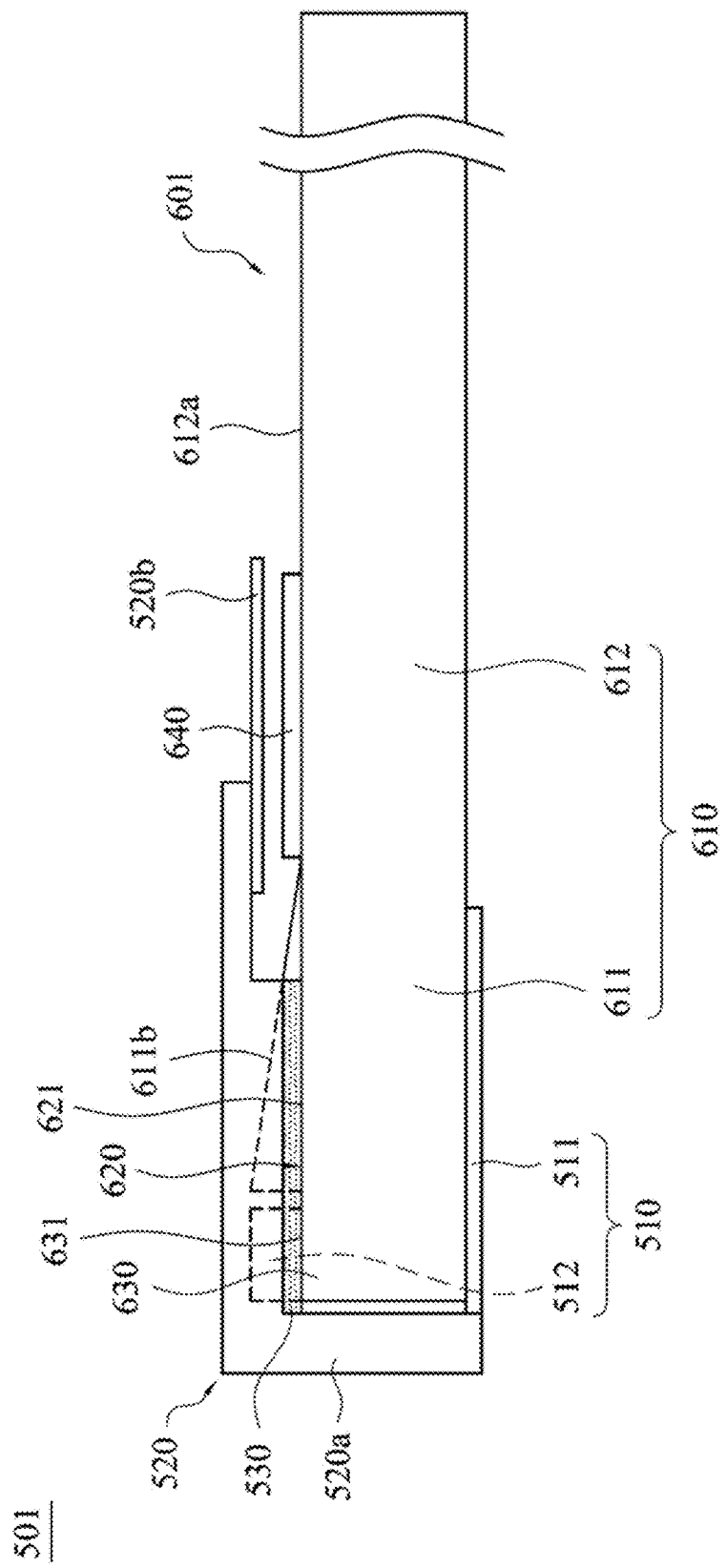
FIG. 25 illustrates a side view of a backlight module in accordance with a fourth embodiment of the present invention.
Figure 26:
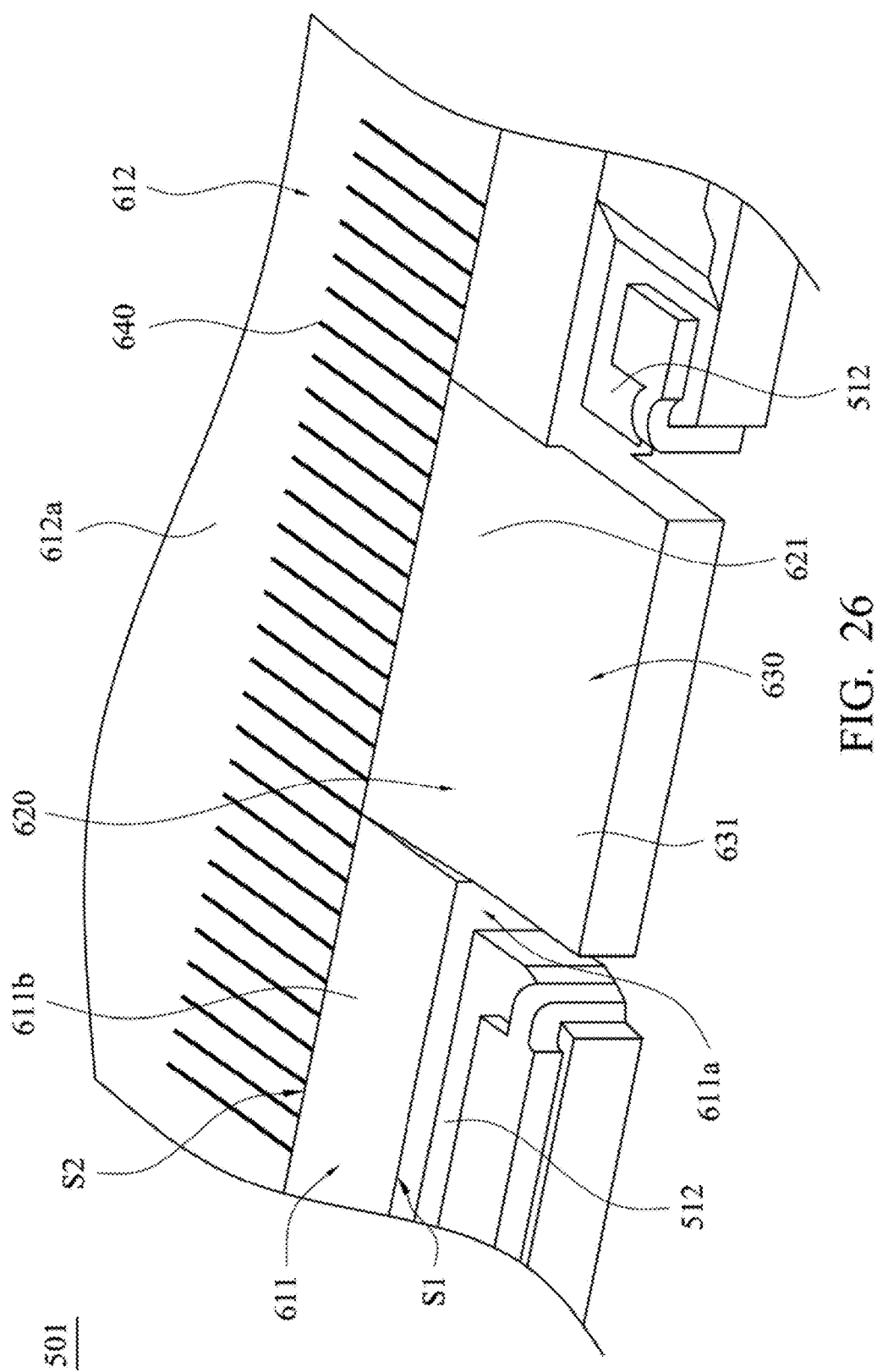
FIG. 26 illustrates a perspective view of the backlight module with omission of a component and adhesive members in accordance with the fourth embodiment of the present invention.

Referring to FIG. 25 and FIG. 26, FIG. 25 illustrates a side view of a backlight module 501 in accordance with a fourth embodiment of the present invention, and FIG. 26 illustrates a perspective view of the backlight module 501 with omission of a component and adhesive members in accordance with the fourth embodiment of the present invention. The backlight module 501 mainly includes a light guide plate 601, a light source 510 disposed adjacent to the light guide plate 601, a component 520 and plural adhesive members 530. The light guide plate 601 includes a main body 610, plural platform portions 620 and plural extending structures 630. The extending structures 630 are connected to the platform portions 620. In some embodiments, the extending structures 630 are connected to each of or a portion of the platform portions 620. The adhesive members 530 can be disposed on the extending structures 630 and the platform portions 620 of the light guide plate 601, so as to adhere the light guide plate 601 to the component 520. In the present embodiment, the design of the extending structures 630 is to provide larger adhesive area for the adhesive members 530 to be disposed thereon. In one embodiment, the component 520 includes a frame 520a and a reflecting film 520b, and the reflecting film 520b is disposed on the frame 520a located between the frame 520a and the main body 610.

Referring to FIG. 25 and FIG. 26 again, the main body 610 of the light guide plate 601 includes a tapered portion 611 and a light guide portion 612. The tapered portion 611 has a light incidence surface 611a and an inclined surface 611b, in which the light incidence surface 611a is located on a side of the tapered portion 611 which has greater thickness, and the inclined surface 611b is connected to the light incidence surface 611a. The light guide portion 612 is connected to a side of the tapered portion 611 which has smaller thickness, and the light guide portion 612 is a flat plate with a uniform thickness. The light guide portion 612 has an optical surface 612a, and the optical surface 612a is connected to the inclined surface 611b.

In the present embodiment, the platform portions 620 are disposed on the tapered portion 611, and each of the platform portions 620 has a flat surface 621. Each of the extending structures 630 protrudes from the platform portions 620, and each of the extending structures 630 has a surface 631. In the present embodiment, the flat surface 621 of each of the platform portions 620 and the surface 631 of each of the extending structures 630 are at the same plane. In addition, as shown in the side view of the light guide plate 601 (i.e. FIG. 25), the flat surface 621 of each of the platform portions 620 is located below the inclined surface 611b of the tapered portion 611. Moreover, the flat surface 621 of each of the platform portions 620, the surface 631 of each of the extending structures 630 and the optical surface 612a are located at the same plane. Therefore, each of the adhesive members 530 can be disposed on the flat surfaces 621 and the surface 631 simultaneously, so that the light guide plate 601 can be adhered to the frame 520a of the component 520 by the adhesive members 530.

As shown in FIG. 25, the light source 510 includes a circuit board 511 and plural light-emitting diodes 512 disposed on the circuit board 511. As shown in FIG. 26, the extending structures 630 are respectively located between two adjacent light-emitting diodes 512. Therefore, when assembling the light source 510 and the light guide plate 601, an assembler can put the extending structures 630 into spaces between two adjacent light-emitting diodes 512 to align the light-emitting diodes 512 with the light incidence surface 611a. Therefore, the extending structures 630 can help the assembler position the light guide plate 601 to the light source 510.

Figure 27:
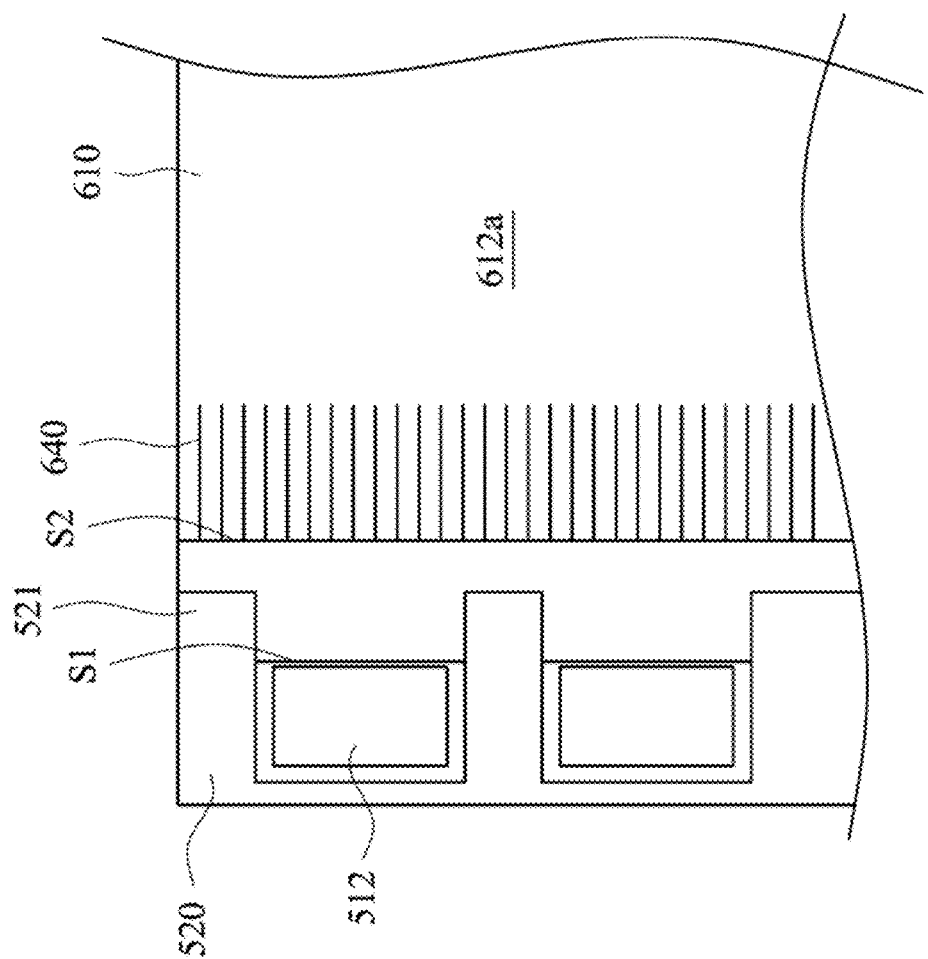
FIG. 27 illustrates a top view of the backlight module in accordance with the fourth embodiment of the present invention.

Simultaneously referring to FIG. 26 and FIG. 27, in which FIG. 27 illustrates a top view of the backlight module 501 in accordance with the fourth embodiment of the present invention. In one embodiment, as shown in the top view of the frame 520a of the component 520, the frame 520a is a comb-shape structure and includes plural extending portions 521 corresponding to the platform portions 620 of the light guide plate 601 and the extending structures 630. The extending portions 521 overlap and are adhered to the platform portions 620 and the extending structures 630.

As shown in FIG. 25 and FIG. 27, in some embodiments, the light guide plate 601 includes plural stripe microstructures 640 disposed on the main body 610. It is noted that the structure and arrangement of the stripe microstructures 640 are similar to those of the stripe microstructures 430, 430a and 430b as shown in FIG. 20 to FIG. 24, and will not be described again herein.

Figure 28:
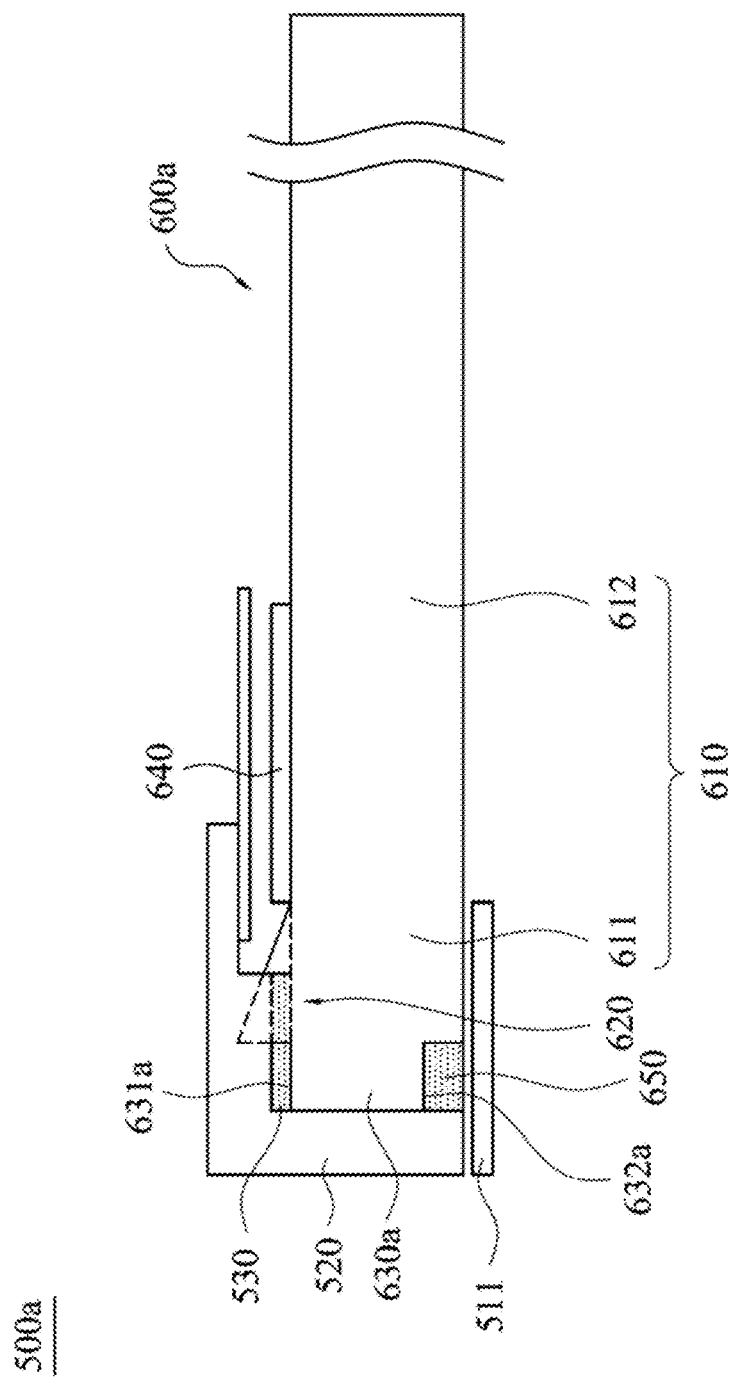
FIG. 28 illustrates a side view of a backlight module in accordance with a fifth embodiment of the present invention.

Referring to FIG. 28, FIG. 28 illustrates a side view of a backlight module 500a in accordance with a fifth embodiment of the present invention. The structure of the backlight module 500a is similar to the structure of the backlight module 501 shown in FIG. 25, and the main difference therebetween is that a light guide plate 600a of the backlight module 501 has different structure. As shown in FIG. 28, each of extending structures 630a of the light guide plate 600a has a surface 631a and a recess portion 632a. The recess portions 632a are mainly used to disposed lower adhesive members 650. In the present embodiment, the extending structures 630a of the light guide plate 600a are located on the circuit board 511 of light source. Therefore, the light guide plate 600a can be adhered to the circuit board 511 of light source by the lower adhesive members 650.

Figure 29:
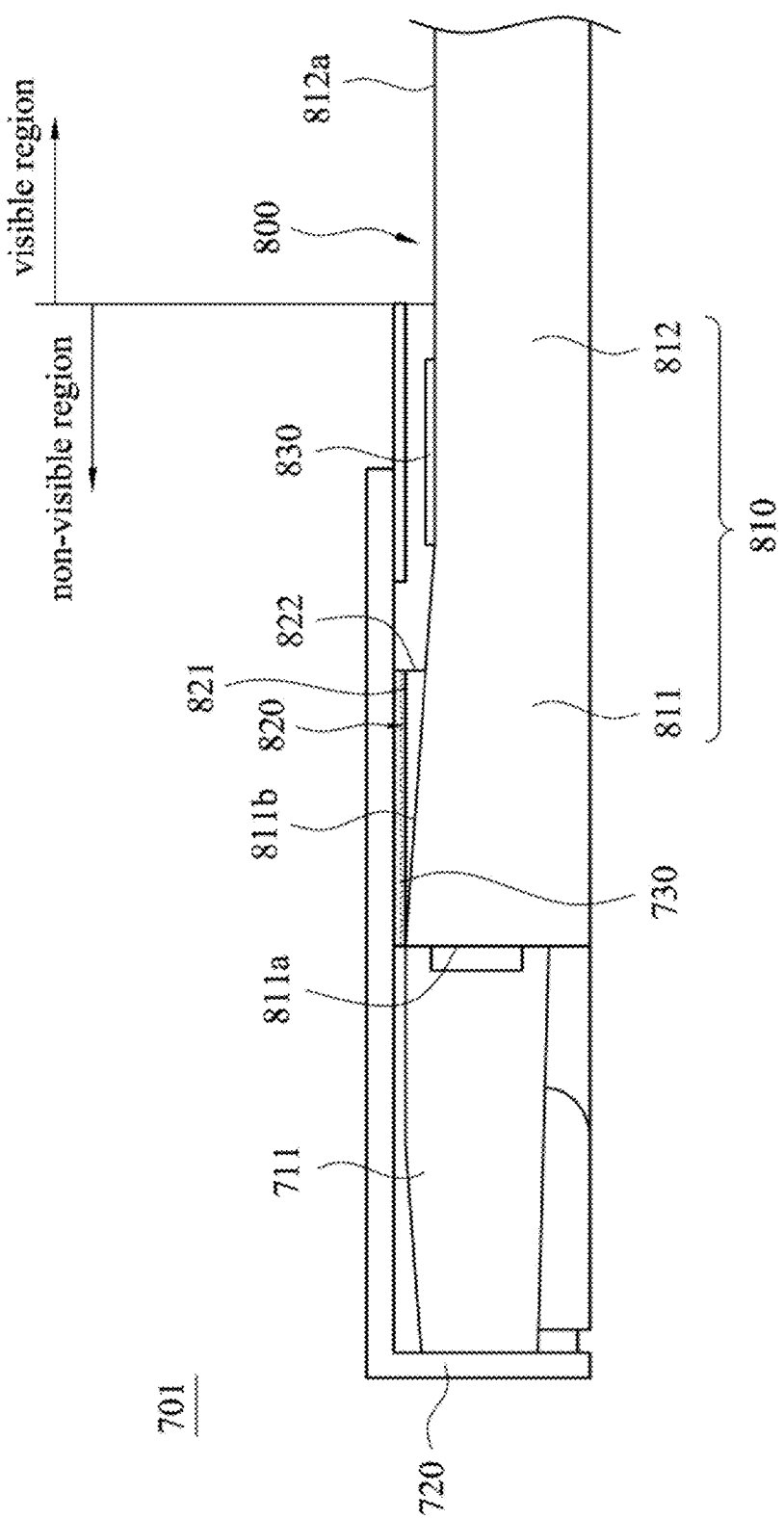
FIG. 29 illustrates a side view of a backlight module in accordance with a sixth embodiment of the present invention.

Referring to FIG. 29, FIG. 29 illustrates a side view of a backlight module 701 in accordance with a sixth embodiment of the present invention. The backlight module 701 of the present embodiment mainly includes a light guide plate 800, a light source 711 adjacent to the light guide plate 800, a component 720 and plural adhesive members 730. The light guide plate 800 includes a main body 810 and plural platform portions 820. The adhesive members 730 can be disposed on the platform portions 820 of the light guide plate 800, so as to adhere the light guide plate 800 on the component 720.

Figure 30:
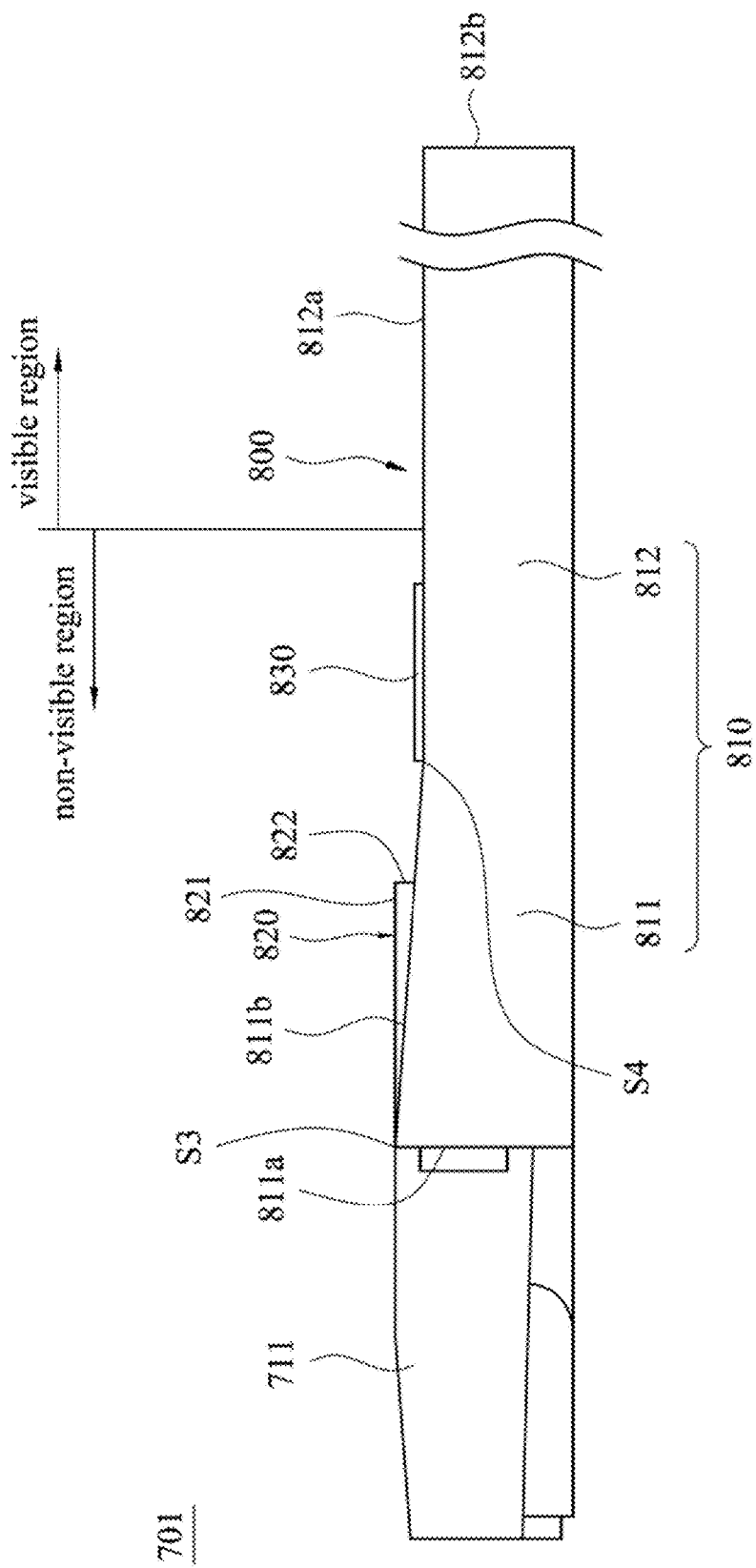
FIG. 30 illustrates a side view of the backlight module with omission of a component and adhesive members in accordance with the sixth embodiment of the present invention.
Figure 31:
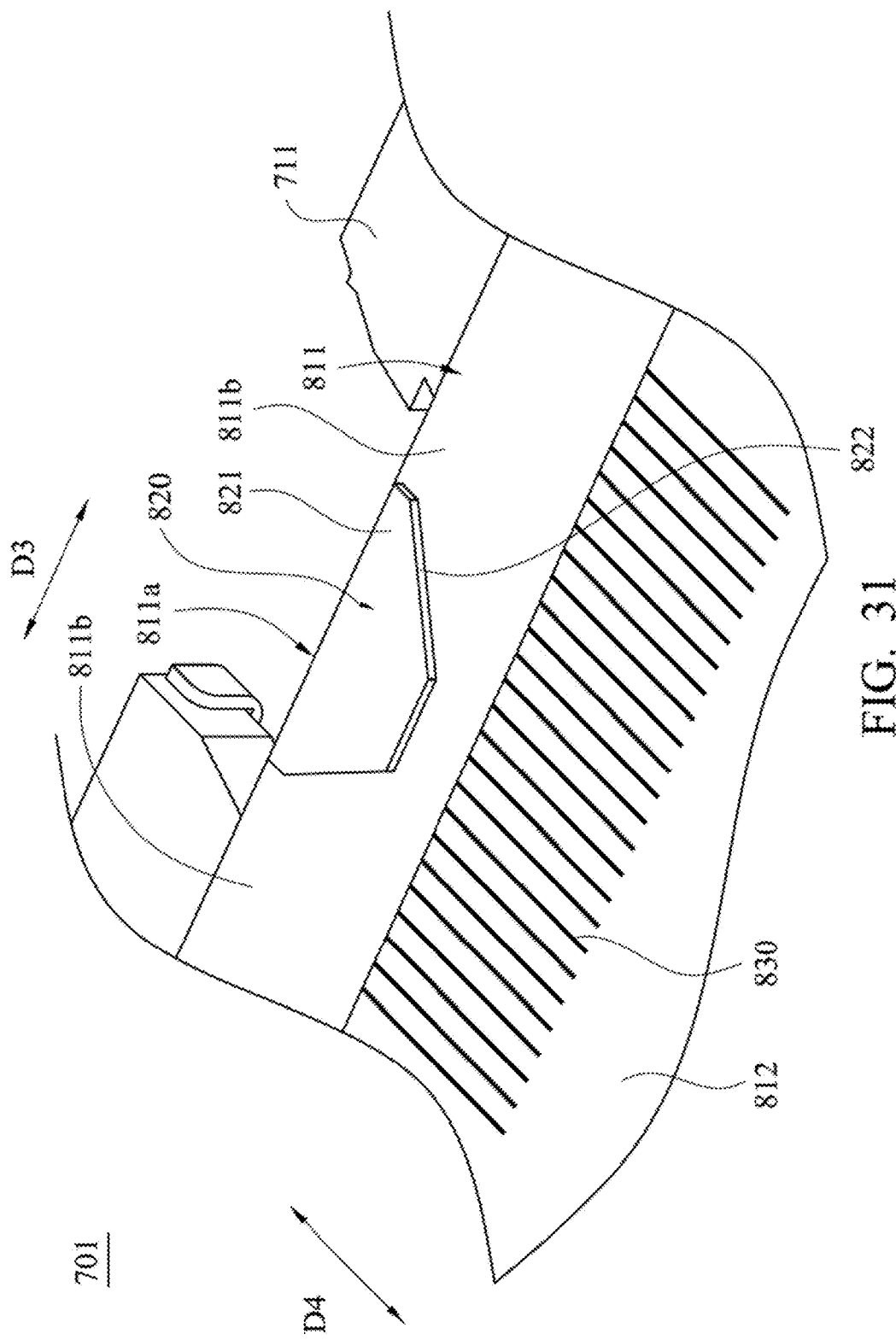
FIG. 31 illustrates a perspective view of the backlight module with omission of a component and adhesive members in accordance with the sixth embodiment of the present invention.

Referring to FIG. 30 and FIG. 31, FIG. 30 and FIG. 31 illustrate a side view and a perspective view of the backlight module 701 with omission of a component and adhesive members in accordance with the sixth embodiment of the present invention. The main body 810 of the light guide plate 800 includes a tapered portion 811 and a light guide portion 812. The tapered portion 811 has a light incidence surface 811a and an inclined surface 811b, in which the light incidence surface 811a is located on a side of the tapered portion 811 which has greater thickness, and the inclined surface 811b is connected to the light incidence surface 811a. The light guide portion 812 is connected to a side of the tapered portion 811 which has smaller thickness, and the light guide portion 812 is a flat plate with a uniform thickness. The light guide portion 812 has an optical surface 812a, and the optical surface 812a is connected to the inclined surface 811b.

Each of the platform portions 820 is disposed on the tapered portion 811, and each of the platform portions 820 has a flat surface 821 and a vertical side surface 822. In one example, the platform portions 820 are arranged along a first direction D3. As shown in FIG. 30 and FIG. 31, the vertical side surface 822 is connected to the flat surfaces 821 and the inclined surface 811b of the tapered portion 811. In addition, as shown in the side view of the light guide plate 800, the flat surface 821 of each of the platform portions 820 is located above the inclined surface 811b, and the flat surface 821 and the optical surface 812a are located at different planes. In addition, the tapered portion 811 has a first edge S3 on the top and a second edge S4 on the bottom. The second edge S4 is connected to the optical surface 812a, and the first edge S3 is spaced from the optical surface 812a at a distance in the thickness direction of the light guide plate 800. In one present embodiment, each of the platform portions 820 is located between the first edge S3 and the second edge S4. In other words, the platform portions 820 are not directly connected to the optical surface 812a. In the present embodiment, the adhesive members 730 are disposed on the flat surfaces 821, so as to adhere the light guide plate 800 to the component 720.

As shown in FIG. 30 and FIG. 31, the light guide plate 800 further includes stripe microstructures 830 disposed on the main body 810, and a length of each of the stripe microstructures 830 is smaller than a length of the main body 810. In the present embodiment, each of the stripe microstructures 830 extends from the second edge S4 towards a direction away from the light incidence surface 811a and is trimmed on the optical surface 812a between the light incidence surface 811a and an opposite surface 812b of the light guide portion 812. In other words, one end of each of the stripe microstructures 830 is connected to the second edge S4 of the tapered portion 811, the other end of each of the stripe microstructures 830 is located on optical surface 812a. In the present embodiment, the portion of each of the stripe microstructures 830 located at the optical surface 812a is parallel to a second direction D4. The second direction D4 is referred to as a direction which is parallel to a normal line of the light incidence surface 811a. In one example, the second direction D4 is vertical to the first direction D3. On the other hand, as shown in FIG. 30, the backlight module 701 of the present embodiment has a visible region and a non-visible region. Each of the stripe microstructures 830 is located in the non-visible region and extends from the second edge S4 towards the opposite surface 812b of the light guide portion 812.

Figure 32:
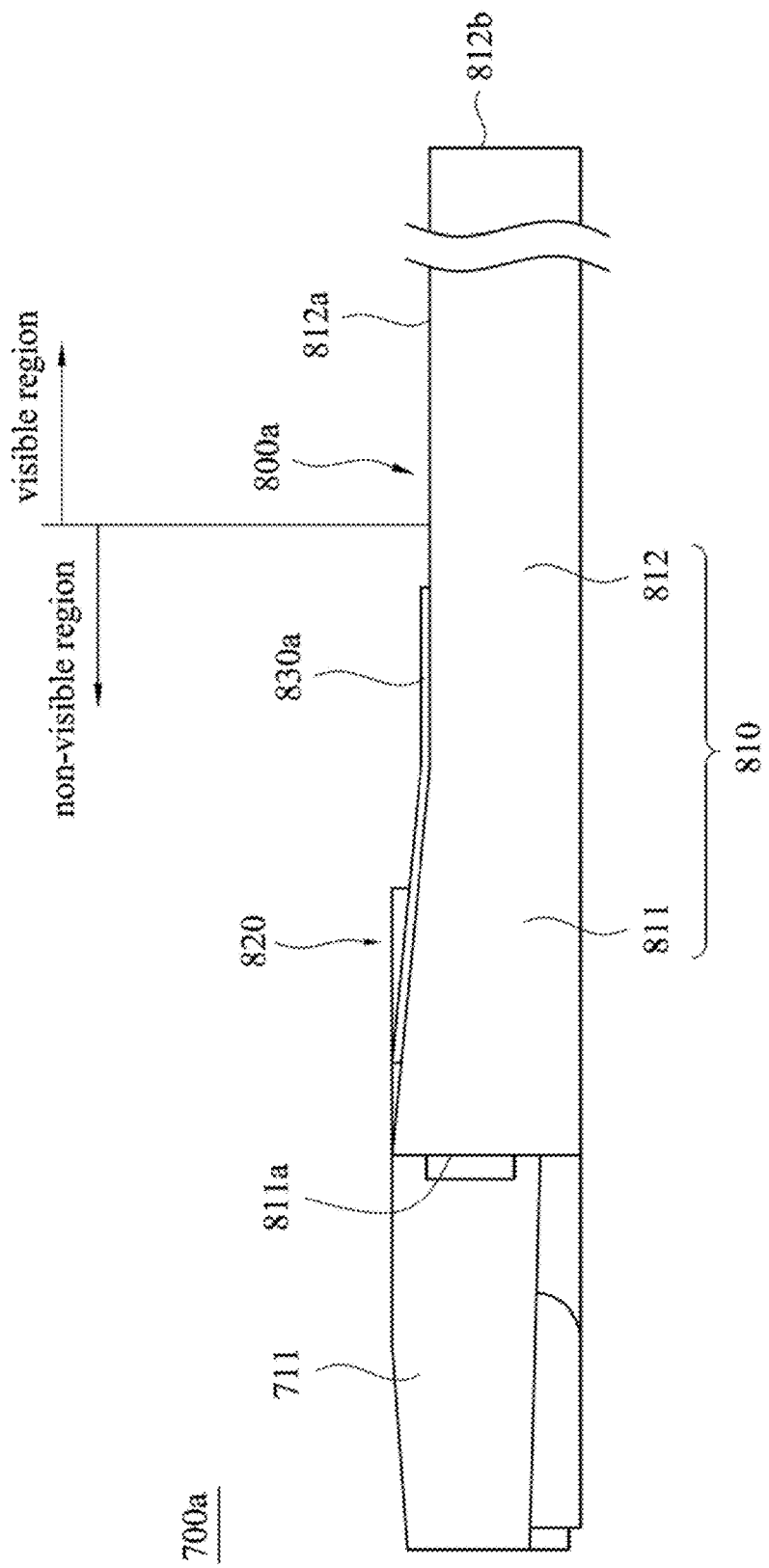
FIG. 32 illustrates a side view of a backlight module with omission of a component and adhesive members in accordance with a seventh embodiment of the present invention.

Referring to FIG. 32, FIG. 32 illustrates a side view of a backlight module 700a with omission of a component and adhesive members in accordance with a seventh embodiment of the present invention. The structure of the backlight module 700a shown in FIG. 32 is similar to the structure of the aforementioned backlight module 701, and the main difference therebetween is that stripe microstructures 830a of a light guide plate 800a of the backlight module 700a have different structures. In the present embodiment, each of the stripe microstructures 830a extends from the tapered portion 811 to the optical surface 812a and is trimmed on the light guide portion 812 between the light incidence surface 811a and the opposite surface 812b. In other words, one end of each of the stripe microstructures 830a is located on the tapered portion 811, the other end of each of the stripe microstructures 830a is located on the optical surface 812a. In the present embodiment the backlight module 700a has a visible region and a non-visible region. Both of the portion of each of the stripe microstructures 830a located on the tapered portion 811 and the portion of each of the stripe microstructures 830a located on the optical surface 812a are located in the non-visible region. In the present embodiment, the light guide plate 800a can be adhered to the component 720 shown in FIG. 29 by disposing the adhesive members 730 shown in FIG. 29 on the platform portions 820 of the light guide plate 800a.

Figure 33:
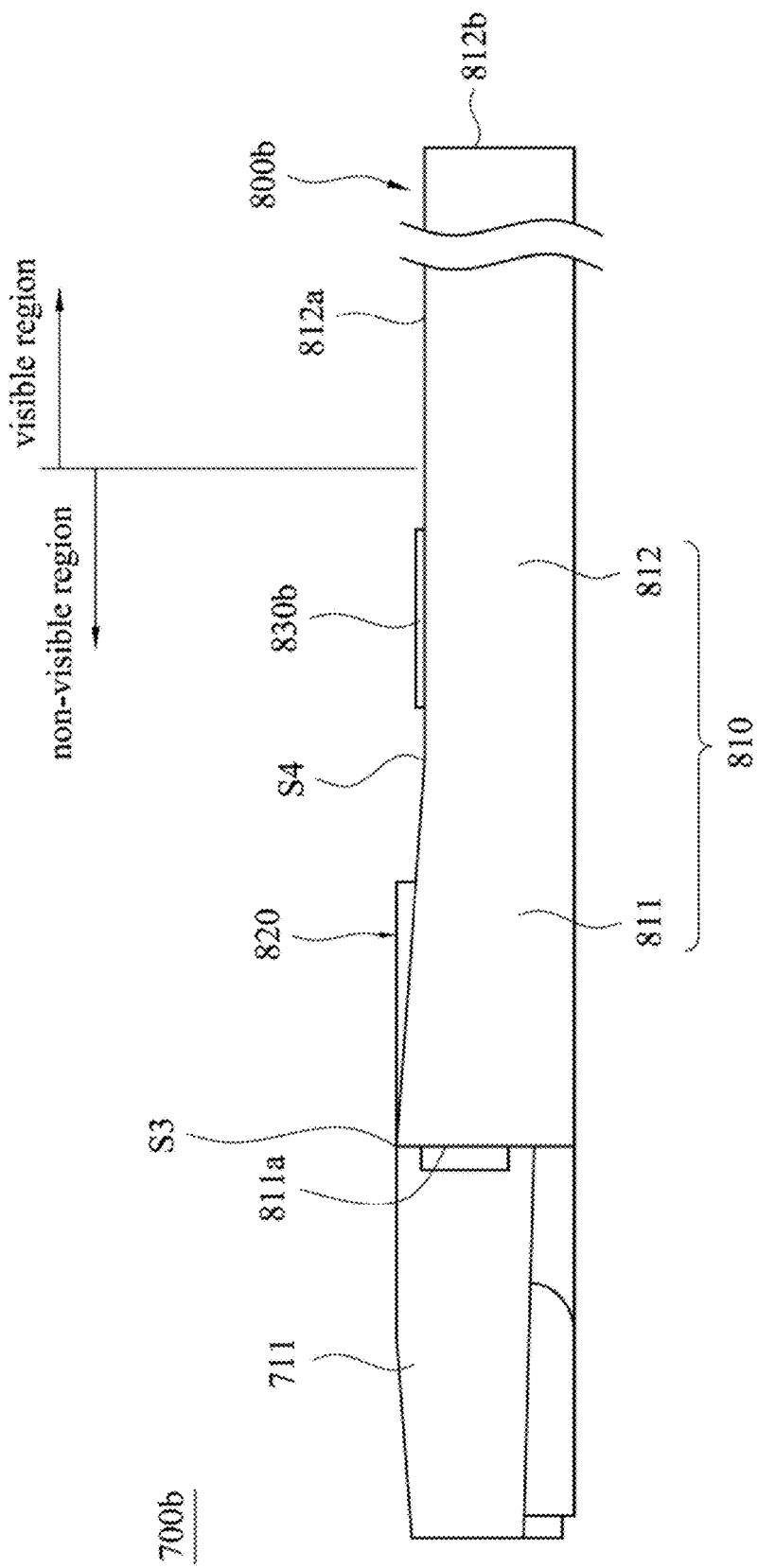
FIG. 33 illustrates a side view of a backlight module with omission of a component and adhesive members in accordance with an eighth embodiment of the present invention.

As shown in FIG. 33, FIG. 33 illustrates a side view of a backlight module 700b in accordance with an eighth embodiment of the present invention. The structure of the backlight module 700b shown in FIG. 33 is similar to the structure of the aforementioned backlight module 701, and the main difference therebetween is that stripe microstructures 830b of a light guide plate 800b of the backlight module 700b have different disposition positions. As shown in FIG. 33, the backlight module 700b has a visible region and a non-visible region. The tapered portion 811 is located in the non-visible region, and the second edge S4 of the tapered portion 811 is separated from the visible region at a distance. In the present embodiment, the stripe microstructures 830b are disposed on the optical surface 812a and located in the non-visible region. The stripe microstructures 830b are separated from the second edge S4 of the tapered portion 811 at a distance. In the present embodiment, the light guide plate 800b can be adhered to the component 720 shown in FIG. 29 by disposing the adhesive members 730 shown in FIG. 29 on the platform portions 820 of the light guide plate 800b.

Figure 34:
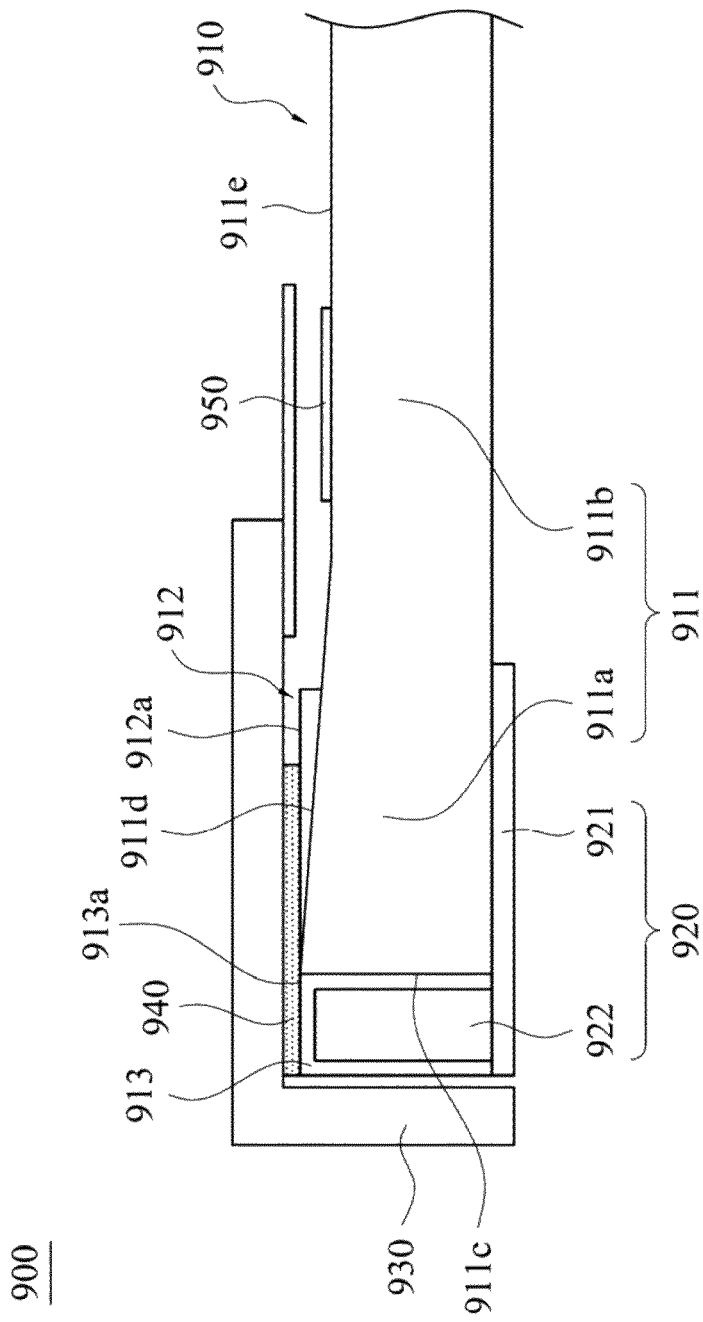
FIG. 34 illustrates a side view of a backlight module in accordance with a ninth embodiment of the present invention.
Figure 35:
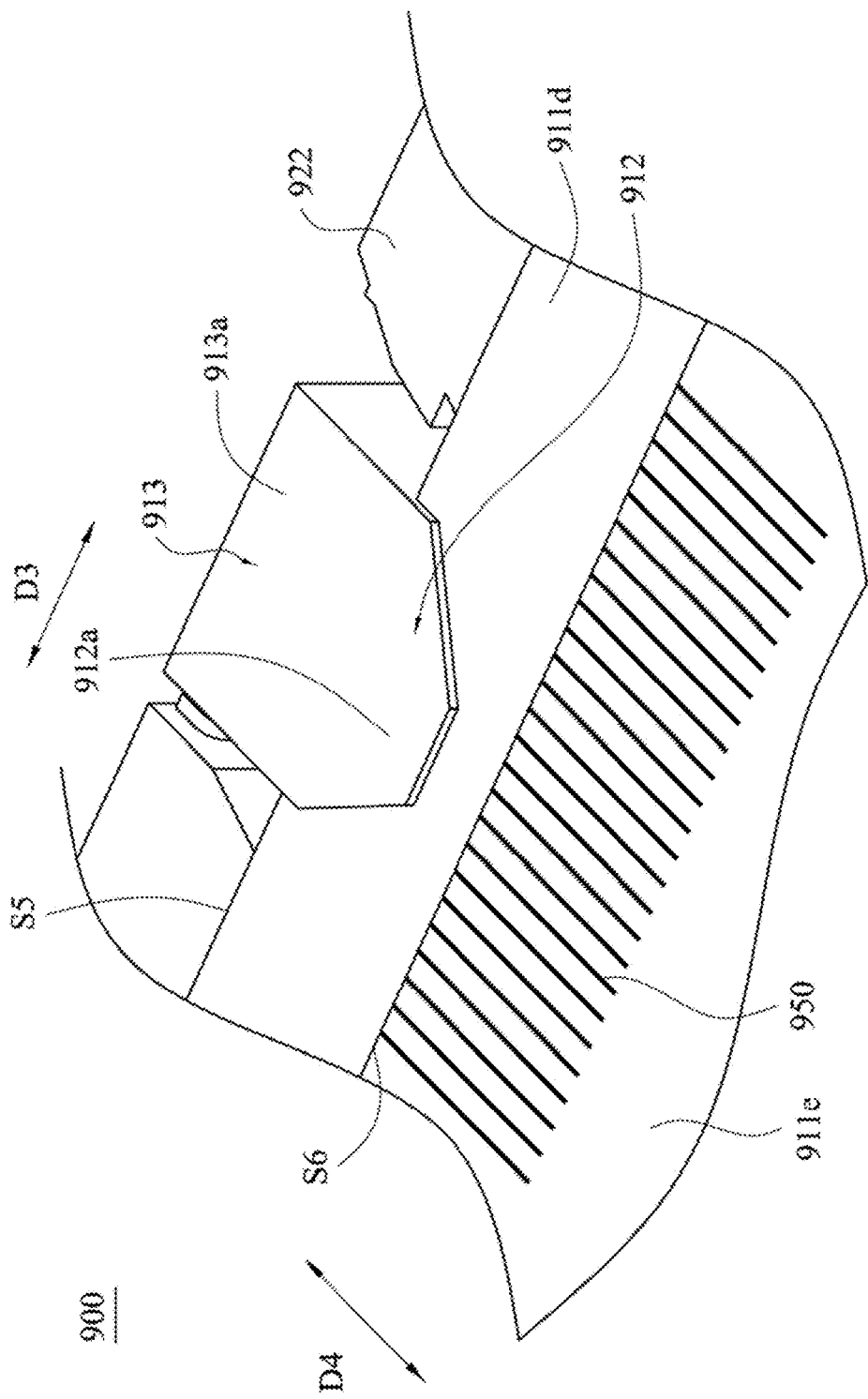
FIG. 35 illustrates a perspective view of the backlight module with omission of a component and adhesive members in accordance with the ninth embodiment of the present invention.

Referring to FIG. 34 and FIG. 35, FIG. 34 illustrates a side view of a backlight module 900 in accordance with a ninth embodiment of the present invention, and FIG. 35 illustrates a perspective view of the backlight module 900 with omission of a component and adhesive members in accordance with the ninth embodiment of the present invention. The backlight module 900 of the present embodiment mainly includes a light guide plate 910, a light source 920 disposed adjacent to the light guide plate 910, a component 930 and plural adhesive members 940. The light guide plate 910 includes a main body 911, plural platform portions 912 and plural extending structures 913. The extending structures 913 are connected to or each of the platform portions 912. The adhesive members 940 can be disposed on the extending structures 913 of the light guide plate 601 and the platform portions 912, so that the light guide plate 910 can be adhered to the component 930 by the adhesive members 940. In the present embodiment, the design of the extending structures 913 is to provide larger adhesive area for the adhesive members 940 to be disposed thereon.

Referring to FIG. 34 and FIG. 35 again, the main body 911 of the light guide plate 910 includes a tapered portion 911a and a light guide portion 911b. The tapered portion 911a has a light incidence surface 911c and an inclined surface 911d, in which the light incidence surface 911c is located on a side of the tapered portion 911a which has greater thickness, and the inclined surface 911d is connected to the light incidence surface 911c. The light guide portion 911b is connected to a side of the tapered portion 911a which has smaller thickness, and the light guide portion 911b is a flat plate with a uniform thickness. The light guide portion 911b has an optical surface 911e, and the optical surface 911e is connected to the inclined surface 911d.

In one present embodiment, each of the platform portions 912 is disposed on the tapered portion 911a and is located between a first edge S5 on the top and a second edge S6 on the bottom of the tapered portion 911a. Each of the platform portions 912 has a flat surface 912a. In addition, each of the extending structures 913 protrudes from the light incidence surface 911c, and each of the extending structures 913 has a surface 913a. In the present embodiment, the flat surface 912a of each of the platform portions 912 and the surface 913a of each of the extending structures 913 are at the same plane. In addition, as shown in the side view of the light guide plate 910, the flat surface 912a of each of the platform portions 912 is located above the inclined surface 911d of the tapered portion 911a. Moreover, the flat surface 912a of each of the platform portions 912 and the optical surface 911e of the light guide portion 911b are located at different planes. Therefore, each of the adhesive members 940 can be disposed on the flat surfaces 912a and the surface 913a simultaneously, so that the light guide plate 910 can be adhered to the component 930 by the adhesive members 940.

As shown in FIG. 34, the light source 920 includes a circuit board 921 and plural light-emitting diodes 922 disposed on the circuit board 921. As shown in FIG. 35, the extending structures 913 are respectively located between two adjacent light-emitting diodes 922. Therefore, when assembling the light source 920 and the light guide plate 910, an assembler can put the extending structures 913 into spaces between two adjacent light-emitting diodes 922 to align the light-emitting diodes 922 with the light incidence surface 911c. Therefore, the extending structures 913 can help the assembler position the light guide plate 910 with the light source 920.

As shown in FIG. 34 and FIG. 35, in some embodiments, the light guide plate 910 includes plural stripe microstructures 950 disposed on the main body 911. It is noted that the structure and arrangement of the stripe microstructures 950 are similar to those of the stripe microstructures 830, 830a and 830b as shown in FIG. 29 to FIG. 33, and will not be described again herein.

Referring to FIG. 36, FIG. 36 illustrates a side view of a display device 1000 in accordance with an embodiment of the present invention. The display device 1000 includes the backlight module 501 as shown in FIG. 25 and a display panel 1100. The display panel 1100 is disposed in front of the light guide plate 601. It is noted that, the component 520 of the backlight module 501 shown in FIG. 25 includes the frame 520a and the reflecting film 520b. However, in the present embodiment, the component 520 only has the reflecting film 520b but does not have the frame 520a shown in FIG. 25. Therefore, the adhesive members 530 in the present embodiment are mainly used to stick the light guide plate 601 on the reflecting film 520b of the component 520. The display device 1000 further includes a shading tape 1300 which can be used to stick the display panel 1100 on the backlight module 501. The reflecting film 520b and the shading tape 1300 are disposed between the light guide plate 601 and the display panel 1100. In one example, reflecting film 520b covers the tapered portion 611 of the light guide plate 601 and extends on the light guide portion 612. The shading tape 1300 is disposed above the reflecting film 520b, so as to prevent light generated from the light-emitting diodes 512 from leaking out of the backlight module 501.

It is noted that, the backlight module 501 shown in FIG. 25 is merely used as an example applied to the display device 1000 for explanation, and embodiments of the present invention are not limited thereto. In other embodiments, other backlight modules, such as the backlight modules 301, 301a, 300b, 500a, 700, 700a, 700b and 900 also can be applied to the display device 1000, so as to achieve the same effect.

According to the aforementioned embodiments of the present invention, adhesive members can be disposed on the platform portions of the light guide plate to adhere the component on the light guide plate. In addition, the extending structures of the light guide plate not only can provide larger adhesive for the adhesive members to be disposed thereon, but also can provide assemblers to align and position the light guide plate with the light source.

Moreover, the stripe microstructures of the light guide plate can overcome the problem of non-uniform brightness of the light guide plate, thus increasing the overall light-emitting appearance of the backlight module and display device.

As is understood by a person skilled in the art, the foregoing preferred embodiments of the present invention are illustrative of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A light guide plate, comprising:
   a main body comprising:
      a tapered portion having a light incidence surface and an inclined surface connected to the light incidence surface; and
      a light guide portion connected to the tapered portion, wherein the light guide portion has an optical surface connected to the inclined surface; and
   a plurality of platform portions integrated with the tapered portion, wherein each of the platform portions has a flat surface, and the flat surface of each of the platform portions is located above the inclined surface of the tapered portion;
   wherein the inclined surface has a first edge and a second edge, the first edge is connected to the light incidence surface, and the second edge is connected to the optical surface;
   wherein the flat surface of each of the platform portions and the optical surface are located at different planes, and each of the platform portions has a vertical side surface connected to the flat surface and the inclined surface; and
   wherein the vertical side surface stands upright at the inclined surface and is separated from the second edge.

2. The light guide plate according to claim 1, wherein each of the platform portions is located between the first edge and the second edge.

3. The light guide plate according to claim 1, further comprising a plurality of extending structures protruding from the light incidence surface, and each of the extending structures are connected to each of or a portion of the platform portions.

4. The light guide plate according to claim 1, further comprising a plurality of stripe microstructures arranged on the main body, wherein at least one portion of each of the stripe microstructures is located at the optical surface and is trimmed between the light incidence surface and an opposite side of the light guide portion, and the portion of each of the stripe microstructures located at the optical surface is parallel to a normal line of the light incidence surface, and a length of each of the stripe microstructures is smaller than a length of the main body.

5. The light guide plate according to claim 1, further comprising a plurality of stripe microstructures distributed on the main body and extending from a bottom edge of the tapered portion towards a direction away from the light incidence surface, and each of the stripe microstructures is trimmed between the light incidence surface and an opposite side of the light guide portion, wherein a length of each of the stripe microstructures is smaller than a length of the main body.

6. The light guide plate according to claim 1, further comprising a plurality of stripe microstructures extending from the inclined surface to the optical surface and trimmed between the light incidence surface and an opposite side of the light guide portion, wherein one portion of each of the stripe microstructures is located on the inclined surface, the other portion of each of the stripe microstructures is parallel to a normal line of the light incidence surface, and a length of each of the stripe microstructures is smaller than a length of the main body.

7. A backlight module, comprising:
   a light source comprising a circuit board and a plurality of light-emitting units disposed on the circuit board;
   a light guide plate disposed adjacent to the light source, wherein the light guide plate comprises:
      a main body comprising:
         a tapered portion having a light incidence surface and an inclined surface connected to the light incidence surface; and
         a light guide portion connected to the tapered portion, wherein the light guide portion has an optical surface connected to the inclined surface; and
      a plurality of platform portions integrated with the tapered portion, wherein each of the platform portions has a flat surface, and the flat surface of each of the platform portions is located above the inclined surface of the tapered portion;
   a component partially covering the light guide plate; and
   a plurality of adhesive members disposed on the flat surfaces, so as to adhere the light guide plate to the component and/or the circuit board of the light source;

wherein the inclined surface has a first edge and a second edge, the first edge is connected to the light incidence surface, and the second edge is connected to the optical surface;

wherein the flat surface of each of the platform portions and the optical surface are located at different planes, and each of the platform portions has a vertical side surface connected to the flat surface and the inclined surface; and wherein the vertical side surface stands upright at the inclined surface and is separated from the second edge.

8. The backlight module according to claim 7, wherein each of the platform portions is located between the first edge and the second edge.

9. The backlight module according to claim 7, wherein the light guide plate further comprising a plurality of extending structures protruding from the light incidence surface, and each of the extending structures are connected to each of or a portion of the platform portions.

10. The backlight module according to claim 9, wherein each of the extending structures has a surface, and the surfaces and the flat surfaces are located at the same plane, and a portion of the adhesive members extends from the flat surfaces of the platform portions to the surfaces of the extending structures.

11. The backlight module according to claim 9, wherein the extending structures are respectively located between two adjacent light-emitting units.

12. The backlight module according to claim 9, wherein each of the extending structures comprises a recess portion, and the backlight module further comprises a plurality of lower adhesive members disposed in the recess portions, and the light guide plate is adhered to the circuit board by the lower adhesive members.

13. The backlight module according to claim 7, wherein the light guide plate further comprises a plurality of stripe microstructures arranged on the main body, wherein at least one portion of each of the stripe microstructures is located at the optical surface and is trimmed between the light incidence surface and an opposite side of the light guide portion, and the portion of each of the stripe microstructures located at the optical surface is parallel to a normal line of the light incidence surface, and a length of each of the stripe microstructures is smaller than a length of the main body.

14. The backlight module according to claim 7, wherein the light guide plate further comprises a plurality of stripe microstructures distributed on the main body and extending from a bottom edge of the tapered portion towards a direction away from the light incidence surface, and each of the stripe microstructures is trimmed between the light incidence surface and an opposite side of the light guide portion, wherein a length of each of the stripe microstructures is smaller than a length of the main body.

15. The backlight module according to claim 7, wherein the light guide plate further comprises a plurality of stripe microstructures extending from the inclined surface to the optical surface and trimmed between the light incidence surface and an opposite side of the light guide portion, wherein one portion of each of the stripe microstructures is located on the inclined surface, the other portion of each of the stripe microstructures is parallel to a not mal line of the light incidence surface, and a length of each of the stripe microstructures is smaller than a length of the main body.

16. The backlight module according to claim 7, wherein the component comprises a reflecting film covering the tapered portion of the main body and extending on the light guide portion.

17. The backlight module according to claim 16, wherein the component further comprises a frame, and the reflecting film is connected to the frame and located between the frame and the main body.

18. A display device, comprising
a backlight module as claimed in claim 7; and
a display panel disposed in front of the light guide plate.

* * * * *